(12) United States Patent
Wang et al.

(10) Patent No.: US 11,659,499 B2
(45) Date of Patent: May 23, 2023

(54) TECHNIQUES FOR DUAL CONNECTIVITY POWER CONTROL

(71) Applicant: QUALCOMM Incorporated, San Diego, CA (US)

(72) Inventors: Xiao Feng Wang, San Diego, CA (US); Peter Gaal, San Diego, CA (US); Wanshi Chen, San Diego, CA (US); Seyedkianoush Hosseini, San Diego, CA (US); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/495,674

(22) Filed: Oct. 6, 2021

(65) Prior Publication Data
US 2022/0030526 A1    Jan. 27, 2022

Related U.S. Application Data

(63) Continuation of application No. 16/510,676, filed on Jul. 12, 2019, now Pat. No. 11,259,255.
(Continued)

(51) Int. Cl.
*H04W 52/38* (2009.01)
*H04W 74/08* (2009.01)
(Continued)

(52) U.S. Cl.
CPC ......... *H04W 52/38* (2013.01); *H04W 52/367* (2013.01); *H04W 72/0473* (2013.01);
(Continued)

(58) Field of Classification Search
CPC .............. H04W 52/38; H04W 52/367; H04W 72/0473; H04W 72/1289; H04W 72/14; H04W 74/0841; H04W 88/06
(Continued)

(56) References Cited

U.S. PATENT DOCUMENTS

2018/0014255 A1    1/2018  Pelletier et al.
2019/0229964 A1    7/2019  Ouchi et al.
(Continued)

FOREIGN PATENT DOCUMENTS

WO    WO-2017197125 A1    11/2017

OTHER PUBLICATIONS

CATT: "Network Assist Dynamic Power Sharing Mechanism", 3GPP TSG RAN WG1 Meeting #90bis, 3GPP Draft; R1-1717847, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, Oct. 2017 (Oct. 8, 2017), pp. 1-3, XP051341031, Retrieved from the Internet: URL: http://www.3gpp.org/ftp/Meetings_3GPP_SYNC/RAN1/Docs/ [retrieved on Oct. 8, 2017] section 1.
(Continued)

*Primary Examiner* — Gbemileke J Onamuti
(74) *Attorney, Agent, or Firm* — Holland & Hart LLP

(57) ABSTRACT

Methods, systems, and devices for wireless communications are described. In some examples, a user equipment (UE) may receive a first set of grants for performing uplink transmissions between the UE and a first group of cells associated with a first radio access technology (RAT) and a second set of grants for performing uplink communication between the UE and a second group of cells associated with a second RAT. The UE may determine that a combined transmit power exceeds a total power limit or that there may be a potential of the combined power exceeding the total power limit. The UE may further perform the uplink communication with the first group of cells using the first RAT and the second group of cells using the second RAT.

28 Claims, 16 Drawing Sheets

Related U.S. Application Data

(60) Provisional application No. 62/698,896, filed on Jul. 16, 2018.

(51) Int. Cl.

| | |
|---|---|
| *H04W 72/12* | (2023.01) |
| *H04W 52/36* | (2009.01) |
| *H04W 72/14* | (2009.01) |
| *H04W 72/04* | (2023.01) |
| *H04W 72/044* | (2023.01) |
| *H04W 88/06* | (2009.01) |

(52) U.S. Cl.
CPC ....... *H04W 72/1289* (2013.01); *H04W 72/14* (2013.01); *H04W 74/0841* (2013.01); *H04W 88/06* (2013.01)

(58) Field of Classification Search
USPC ........................................................ 370/329
See application file for complete search history.

(56) References Cited

U.S. PATENT DOCUMENTS

| | | | |
|---|---|---|---|
| 2020/0022097 | A1 | 1/2020 | Wang et al. |
| 2020/0296627 | A1 | 9/2020 | Arvidson et al. |

OTHER PUBLICATIONS

Ericsson: "On Remaining Issues of NR-LTE Co-Existence", 3GPP TSG-RAN WG1 #92bis, 3GPP Draft; R1-1804455—On Remaining Issues NR-LTE Co Existence, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018- Apr. 20, 2018, Apr. 15, 2018 (Apr. 15, 2018), 6 Pages, XP051426734, Retrieved from the Internet: URL: http://www.3gpp.org/ftp/Meetings%5F3GPP%5FSYNC/RAN1/Docs/ [retrieved on Apr. 15, 2018] section 2.2.

Ericsson: "Remaining Issues for LTE-NR Power Sharing", 3GPP TSG-RAN WG1 AH 1801, 3GPP Draft; R1-1800958_LTE_NR_Power_Sharing_V0, 3rd Generation Partnership Project (3GPP), Mobile Competence Centre; 650, Route Des Lucioles; F-0692, Sophia-Antipolis Cedex; France, vol. RAN WG1, No. Vancouver, Canada; Jan. 22, 2018-Jan. 26, 2018, Jan. 13, 2018 (Jan. 13, 2018), 7 Pages, XP051385191, Retrieved from the Internet: URL: http://www.3gpp.org/ftp/tsg%5Fran/WG1%5FRL1/TSGR1%5FAH/NR%5FAH%5F1801/Docs/[retrieved on Jan. 13, 2018] section 2.1.

International Preliminary Report on Patentability—PCT/US2019/041936, The International Bureau of WIPO—Geneva, Switzerland, dated Oct. 9, 2021 (184060WO).

International Search Report and Written Opinion—PCT/US2019/041936—ISA/EPO—dated Oct. 9, 2019 (184060WO).

LG Electronics: "Discussion on Dynamic Power Sharing with sTTI for DC", 3GPP TSG RAN WG1 NR AH1801, 3GPP Draft; R1-1800392 STTI Dynamic Power Sharing V4, 3rd Generation Partnership Project (3GPP), Mobile Competence Centre; 650, Route Des Lucioles; F-0692, Sophia-Antipolis Cedex; France, vol. RAN WG1, No. Vancouver, Canada; Jan. 22, 2018-Jan. 26, 2018, Jan. 13, 2018 (Jan. 13, 2018), 4 Pages, XP051384847, Retrieved from the Internet: URL: http://www.3gpp.org/ftp/tsg%5Fran/WG1%5FRL1/TSGR1%5FAH/NR%5FAH%5F1801/Docs/[retrieved on Jan. 13, 2018] section 2.1.

European Search Report—EP22211007—Search Authority—The Hague—dated Jan. 4, 2023.

Taiwan Search Report—TW108124890—TIPO—dated Feb. 16, 2023.

TECHNIQUES FOR DUAL CONNECTIVITY POWER CONTROL

CROSS REFERENCE

The present Application for Patent is a Continuation of U.S. patent application Ser. No. 16/510,676 by WANG et al., entitled "TECHNIQUES FOR DUAL CONNECTIVITY POWER CONTROL" filed Jul. 12, 2019, which claims the benefit of U.S. Provisional Patent Application No. 62/698,896 by WANG, et al., entitled "TECHNIQUES FOR DUAL CONNECTIVITY POWER CONTROL," filed Jul. 16, 2018, assigned to the assignee hereof, and each of which is expressly incorporated by reference in its entirety herein.

BACKGROUND

The following relates generally to wireless communications, and more specifically to techniques for dual connectivity power control.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may be configured for dual connectivity where a UE can communicate with different cell groups. In some cases, each cell group may be associated with a different radio access technology (RAT). Some techniques do not provide a mechanism where dynamic power sharing is fully supported in dual connectivity with a first cell group operating in a RAT and a secondary cell group operating in another different RAT. Improved techniques for dual connectivity power control are desired.

SUMMARY

The described techniques relate to improved methods, systems, devices, and apparatuses that support techniques for dual connectivity power control. Generally, the described techniques provide for power control in a dual connectively scenario involving a first cell group (e.g., a master cell group) associated with a first RAT and a second cell group (e.g., a secondary cell group) associated with a second RAT. Specifically, the described techniques may relate to dual connectivity in a New Radio (NR) evolved universal terrestrial access network (E-UTRAN) dual connectivity (NE-DC) scenario.

Broadly, aspects of the described techniques provide a mechanism for a user equipment (UE) to perform power sharing or power reduction operations on one or both of a first group of cells associated with a first radio access technology (RAT) and a second group of cells associated with a second RAT. For example, the UE may be operating in a dual connectivity mode with connections to the first group of cells and the second group of cells. In some examples, the first group of cells may be associated with an LTE RAT and the second group of cells may be associated with a NR RAT.

The UE may determine that it has uplink communications to perform (e.g., currently or in the future) with the first group of cells and the second group of cells. For example, the UE may receive a first set of grants for performing uplink transmissions between the UE and at least some of the first group of cells and a second set of grants for performing uplink transmissions between the UE and at least some of the second group of cells. In some examples, the UE may receive a power limit adjustment factor or a reduced power limit from a network device. In some cases, the UE may determine that it is configured for power sharing based on the received grants and the received power adjustment factor. The UE may also, in some examples, determine (e.g., calculate) a combined transmit power based on a first aggregated transmit power for an uplink channel using the first RAT and a second aggregated transmit power for an uplink channel using the second RAT. The UE may further determine that the combined transmit power exceeds or may have a potential of exceeding a total power limit.

In some cases, the UE may determine a first power limit for the first aggregated transmit power or a second power limit for the second aggregated transmit power, or both. Accordingly, the UE may perform uplink communication with the first group of cells using the first RAT and uplink communication with the second group of cells using the second RAT based on one or more transmit powers. In some cases, the UE may selectively perform the uplink communication with the first group of cells using the first RAT or the second group of cells using the second RAT.

A method of wireless communication at a UE is described. The method may include receiving a first set of grants for performing uplink transmissions between the UE and a first group of cells associated with a first RAT and a second set of grants for performing uplink communication between the UE and a second group of cells associated with a second RAT, the second RAT being an NR RAT, determining that a combined transmit power exceeds a total power limit or that there is a potential of the combined power exceeding the total power limit, based on the first set of grants and the second set of grants, the combined transmit power including a first aggregated transmit power for an uplink channel using the first RAT and a second aggregated transmit power for an uplink channel using the second RAT, determining at least one of a first power limit for the first aggregated transmit power or a second power limit for the second aggregated transmit power, and performing the uplink communication with the first group of cells using the first RAT and the uplink communication with the second group of cells using the second RAT based on the first power limit, the second power limit, or both.

An apparatus for wireless communication at a UE is described. The apparatus may include a processor, memory in electronic communication with the processor, and instructions stored in the memory. The instructions may be executable by the processor to cause the apparatus to receive a first set of grants for performing uplink transmissions between the UE and a first group of cells associated with a first RAT and a second set of grants for performing uplink communication between the UE and a second group of cells associated with a second RAT, the second RAT being an NR RAT, determine that a combined transmit power exceeds a total power limit or that there is a potential of the combined power exceeding the total power limit, based on the first set of grants and the second set of grants, the combined transmit power including a first aggregated transmit power for an uplink channel using the first RAT and a second aggregated transmit power for an uplink channel using the second RAT, determine at least one of a first power limit for the first aggregated transmit power or a second power limit for the second aggregated transmit power, and perform the uplink communication with the first group of cells using the first RAT and the uplink communication with the second group of cells using the second RAT based on the first power limit, the second power limit, or both.

Another apparatus for wireless communication at a UE is described. The apparatus may include means for receiving a first set of grants for performing uplink transmissions between the UE and a first group of cells associated with a first RAT and a second set of grants for performing uplink communication between the UE and a second group of cells associated with a second RAT, the second RAT being an NR RAT, determining that a combined transmit power exceeds a total power limit or that there is a potential of the combined power exceeding the total power limit, based on the first set of grants and the second set of grants, the combined transmit power including a first aggregated transmit power for an uplink channel using the first RAT and a second aggregated transmit power for an uplink channel using the second RAT, determining at least one of a first power limit for the first aggregated transmit power or a second power limit for the second aggregated transmit power, and performing the uplink communication with the first group of cells using the first RAT and the uplink communication with the second group of cells using the second RAT based on the first power limit, the second power limit, or both.

A non-transitory computer-readable medium storing code for wireless communication at a UE is described. The code may include instructions executable by a processor to receive a first set of grants for performing uplink transmissions between the UE and a first group of cells associated with a first RAT and a second set of grants for performing uplink communication between the UE and a second group of cells associated with a second RAT, the second RAT being an NR RAT, determine that a combined transmit power exceeds a total power limit or that there is a potential of the combined power exceeding the total power limit, based on the first set of grants and the second set of grants, the combined transmit power including a first aggregated transmit power for an uplink channel using the first RAT and a second aggregated transmit power for an uplink channel using the second RAT, determine at least one of a first power limit for the first aggregated transmit power or a second power limit for the second aggregated transmit power, and perform the uplink communication with the first group of cells using the first RAT and the uplink communication with the second group of cells using the second RAT based on the first power limit, the second power limit, or both.

Some examples of the method, apparatuses, and non-transitory computer-readable medium described herein may further include operations, features, means, or instructions for transmitting an indication of a UE capability to a network of the second RAT, where the indication of the UE capability includes a minimum scheduling delay for performing a power adjustment of the first RAT based on performing the uplink communication with the second group of cells using the second RAT.

Some examples of the method, apparatuses, and non-transitory computer-readable medium described herein may further include operations, features, means, or instructions for receiving information identifying a mapping between a scheduling delay of the second RAT and a scheduling delay command field in a downlink control indicator (DCI) for performing the uplink communication with the second group of cells associated with the second RAT and modifying an existing mapping based on the transmitted UE capability, where performing the uplink communication with the second group of cells associated with the second RAT may be based on the modified mapping.

In some examples of the method, apparatuses, and non-transitory computer-readable medium described herein, modifying the existing mapping may include operations, features, means, or instructions for adding a fixed offset to the existing mapping between the scheduling delay of the second RAT and the scheduling delay command field in the DCI. In some examples of the method, apparatuses, and non-transitory computer-readable medium described herein, a scheduling delay of the second RAT may be greater than or equal to a minimum scheduling delay of the first RAT. In some examples of the method, apparatuses, and non-transitory computer-readable medium described herein, a scheduling delay of the second RAT may be greater than or equal to four milliseconds or a predefined value.

In some examples of the method, apparatuses, and non-transitory computer-readable medium described herein, a transmit power of the second RAT may be unchanged and a transmit power of the first RAT may be reduced, where a sum of the transmit power of the first RAT and the transmit power of the second RAT does not exceed the total power limit. Some examples of the method, apparatuses, and non-transitory computer-readable medium described herein may further include operations, features, means, or instructions for receiving, from a network device, a power limit adjustment factor or a reduced power limit for the uplink communication associated with the first RAT, adjusting the first power limit based on the power limit adjustment factor or the reduced power limit and performing power sharing for the uplink communication associated with the first RAT and the uplink communication associated with the second RAT based on determining that the combined transmit power exceeds or may have a potential of exceeding the total power limit.

Some examples of the method, apparatuses, and non-transitory computer-readable medium described herein may further include operations, features, means, or instructions for determining that a sum of the first power limit of the first RAT and the second power limit of the second RAT exceeds or may have the potential of exceeding the total power limit when the uplink communication with the first group of cells overlaps in time with one or more potential uplink symbols associated with the second group of cells, determining that the first power limit may be adjusted based on the power limit adjustment factor or the reduced power limit and determining that the uplink communication with the first group of cells overlaps in time with the one or more potential uplink symbols associated with the second group of cells and adjusting the second power limit based on the second power limit, the total power limit, and the determined transmit power of the first RAT.

In some examples of the method, apparatuses, and non-transitory computer-readable medium described herein, a symbol associated with the second group of cells may be determined as the one or more potential uplink symbols based on the symbol being configured as an uplink symbol or a flexible symbol for at least one cell of the second group of cells. Some examples of the method, apparatuses, and non-transitory computer-readable medium described herein may further include operations, features, means, or instructions for receiving a dynamic slot format indicator (SFI) included in a DCI format identifying formats of one or more symbols within a period of time starting from a first time to a second time for one or more of the second group of cells associated with the second RAT, where formats of one or more slots may be considered effective in determining the one or more potential uplink symbols starting from a predefined time after the first time and ending at the second time.

Some examples of the method, apparatuses, and non-transitory computer-readable medium described herein may further include operations, features, means, or instructions for determining that no potential uplink symbol associated with the second RAT may be present in a slot of an uplink communication with the first RAT based on the formats of the one or more slots and performing the uplink communication with the first RAT based on the first power limit.

In some examples of the method, apparatuses, and non-transitory computer-readable medium described herein, adjusting the second power limit may include operations, features, means, or instructions for determining a difference between the total power limit and a transmit power of the first RAT, where the transmit power of the first RAT may be based on the adjusted first power limit and adjusting the second power limit to be a minimum of the second power limit of the second RAT and the determined difference. In some examples of the method, apparatuses, and non-transitory computer-readable medium described herein, a value of the power limit adjustment factor may be less than or equal to one.

Some examples of the method, apparatuses, and non-transitory computer-readable medium described herein may further include operations, features, means, or instructions for determining that an upcoming transmission includes a first Physical Random Access Channel (PRACH) associated with a primary cell of the first RAT and a second PRACH associated with a primary cell of the second RAT, allocating a transmit power needed for the first PRACH based on the first power limit, allocating a transmit power needed for the second PRACH based on the second power limit and allocating a remaining power to one or more overlapping channels.

Some examples of the method, apparatuses, and non-transitory computer-readable medium described herein may further include operations, features, means, or instructions for determining that a transmission of the first PRACH collides with a transmission of the second PRACH, where allocating the transmit power needed for the first PRACH further includes, determining a difference between the total power limit and the allocated transmit power needed for the second PRACH and allocating the transmit power needed for the first PRACH by allocating a minimum of the transmit power needed for the first PRACH and the determined difference.

Some examples of the method, apparatuses, and non-transitory computer-readable medium described herein may further include operations, features, means, or instructions for receiving, from a network device, a power limit adjustment factor or a reduced power limit for the total power limit, adjusting the total power limit based on the power limit adjustment factor or the reduced power limit and performing power sharing for the uplink communication associated with the first RAT and the uplink communication associated with the second RAT based on determining that the combined transmit power exceeds or may have a potential of exceeding the adjusted total power limit.

Some examples of the method, apparatuses, and non-transitory computer-readable medium described herein may further include operations, features, means, or instructions for receiving, from a network device, a power limit adjustment factor or a reduced power limit for the uplink communication associated with the second RAT, adjusting the second power limit based on the power limit adjustment factor or the reduced power limit and performing power sharing for the uplink communication associated with the first RAT and the uplink communication associated with the second RAT based on determining that the combined transmit power exceeds or may have a potential of exceeding the total power limit.

Some examples of the method, apparatuses, and non-transitory computer-readable medium described herein may further include operations, features, means, or instructions for determining that a sum of the first power limit of the first RAT and the second power limit of the second RAT exceeds the total power limit or may have a potential of exceeding the total power limit when the uplink communication with the first group of cells overlaps in time with one or more potential uplink symbols associated with the second group of cells, adjusting the first power limit based on the first power limit, the adjusted second power limit, and the total power limit and adjusting the second power limit based on the second power limit, the total power limit, and the determined transmit power of the first RAT.

In some examples of the method, apparatuses, and non-transitory computer-readable medium described herein, adjusting the first power limit may include operations, features, means, or instructions for determining a difference between the total power limit and the adjusted second power limit and adjusting the first power limit to be a minimum of the first power limit of the first RAT and the determined difference.

In some examples of the method, apparatuses, and non-transitory computer-readable medium described herein, adjusting the second power limit may include operations, features, means, or instructions for determining a difference between the total power limit and a transmit power of the first RAT, where the transmit power of the first RAT may be based on the adjusted first power limit and adjusting the second power limit to be a minimum of the second power limit of the second RAT and the determined difference.

Some examples of the method, apparatuses, and non-transitory computer-readable medium described herein may further include operations, features, means, or instructions for determining that no potential uplink symbol associated with the second RAT may be present in a slot of an uplink communication with the first RAT and performing the uplink communication with the first group of cells using the first RAT based on the first power limit.

Some examples of the method, apparatuses, and non-transitory computer-readable medium described herein may further include operations, features, means, or instructions for receiving, from a network device, a first power limit adjustment factor or a first reduced power limit for the uplink communication with the first group of cells associated with the first RAT and a second power limit adjustment factor or a second reduced power limit for the uplink communication with the second group of cells associated with the second RAT, where determining the first power limit may be based on the first power limit adjustment factor or the first reduced power limit and determining the second power limit may be based on the second power limit adjustment factor or the second reduced power limit.

In some examples of the method, apparatuses, and non-transitory computer-readable medium described herein, a combined power limit as a result of the first power limit adjustment factor or the first reduced power limit and the second power limit adjustment factor or the second reduced power limit may be less than or equal the total power limit.

Some examples of the method, apparatuses, and non-transitory computer-readable medium described herein may further include operations, features, means, or instructions for selectively performing the uplink communication with the first group of cells associated with the first RAT based on the determined first power limit. In some examples of the method, apparatuses, and non-transitory computer-readable medium described herein, the first RAT may be a LTE RAT.

A method of wireless communication at a base station is described. The method may include identifying at least one of a scheduling delay, a power limit adjustment factor, or a reduced power limit for uplink communication associated with a RAT between a UE and the base station, where the scheduling delay is based on a UE capability and the RAT is an NR RAT, transmitting a set of grants for performing uplink communication between the UE and the base station associated with the RAT based on the identifying, the set of grants including at least one of the determined scheduling delay, the determined power limit adjustment factor, or the reduced power limit and communicating with the UE using the RAT based on the set of grants.

An apparatus for wireless communication at a base station is described. The apparatus may include a processor, memory in electronic communication with the processor, and instructions stored in the memory. The instructions may be executable by the processor to cause the apparatus to identify at least one of a scheduling delay, a power limit adjustment factor, or a reduced power limit for uplink communication associated with a RAT between a UE and the base station, where the scheduling delay is based on a UE capability and the RAT is an NR RAT, transmit a set of grants for performing uplink communication between the UE and the base station associated with the RAT based on the identifying, the set of grants including at least one of the determined scheduling delay, the determined power limit adjustment factor, or the determined reduced power limit, and communicate with the UE using the RAT based on the set of grants.

Another apparatus for wireless communication at a base station is described. The apparatus may include means for identifying at least one of a scheduling delay, a power limit adjustment factor, or a reduced power limit for uplink communication associated with a RAT between a UE and the base station, where the scheduling delay is based on a UE capability and the RAT is an NR RAT, transmitting a set of grants for performing uplink communication between the UE and the base station associated with the RAT based on the identifying, the set of grants including at least one of the determined scheduling delay, the determined power limit adjustment factor, or the determined reduced power limit, and communicating with the UE using the RAT based on the set of grants.

A non-transitory computer-readable medium storing code for wireless communication at a base station is described. The code may include instructions executable by a processor to identify at least one of a scheduling delay, a power limit adjustment factor, or a reduced power limit for uplink communication associated with a RAT between a UE and the base station, where the scheduling delay is based on a UE capability and the RAT is an NR RAT, transmit a set of grants for performing uplink communication between the UE and the base station associated with the RAT based on the identifying, the set of grants including at least one of the determined scheduling delay, the determined power limit adjustment factor, or the reduced power limit and communicate with the UE using the RAT based on the set of grants.

Some examples of the method, apparatuses, and non-transitory computer-readable medium described herein may further include operations, features, means, or instructions for receiving an indication of the UE capability from the UE, where the indication of the UE capability includes a minimum scheduling delay for performing a power adjustment of a second RAT based on performing uplink communication with the base station using the RAT and determining the scheduling delay based on the indication of the UE capability, where the scheduling delay satisfies a determined threshold.

Some examples of the method, apparatuses, and non-transitory computer-readable medium described herein may further include operations, features, means, or instructions for transmitting information identifying a mapping between the scheduling delay and a scheduling delay command field in a DCI for performing the uplink communication with the base station associated with the RAT and communicating with the UE using the RAT based on a modified mapping that may be based on the UE capability.

In some examples of the method, apparatuses, and non-transitory computer-readable medium described herein, the scheduling delay may be greater than or equal to a minimum scheduling delay for the uplink communication associated with a LTE RAT. In some examples of the method, apparatuses, and non-transitory computer-readable medium described herein, the scheduling delay may be greater than or equal to four milliseconds or a predefined value.

Some examples of the method, apparatuses, and non-transitory computer-readable medium described herein may further include operations, features, means, or instructions for receiving the power limit adjustment factor or the reduced power limit, where communicating with the UE using the RAT may be based on the power limit adjustment factor or the reduced power limit. In some examples of the method, apparatuses, and non-transitory computer-readable medium described herein, a value of the power limit adjustment factor or the reduced power limit may be less than or equal to one.

DETAILED DESCRIPTION

In some aspects, a user equipment (UE) may be configured for power sharing operations when operating in a dual connectivity mode. For example, the UE may operate in the dual connectivity mode and perform communications with a first cell group and a second cell group, with each cell group being associated with a different radio access technology (RAT). In some cases, the UE may be configured to support power sharing for the communications with the first cell group and/or the second cell group. Other techniques, however, may not always support the transmit power of one cell group being considered in determining the transmit power of the other cell group. Accordingly, the UE in this scenario may not be fully configured to support power sharing operations between a first cell group associated with the first RAT and a second cell group associated with the second RAT.

Aspects of the disclosure are initially described in the context of a wireless communications system. The UE may determine that it has uplink communications to perform (e.g., currently or in the future) between the UE and the first group of cells and the UE and the second group of cells. For example, the UE may receive a first set of grants for performing uplink transmissions between the UE and the first group of cells and a second set of grants. In some examples, the first group of cells and the second group of cells may be associated with different RATs such as a long term evolution (LTE) RAT and a New Radio (NR) RAT, as merely examples. The UE may calculate a first aggregated transmit power for the uplink channel associated with the first RAT and a second aggregated transmit power for the uplink channel associated with the second RAT. The UE may then calculate a combined transmit power based on the first aggregated transmit power and the second aggregated transmit power.

For example, the UE may calculate a total power including a transmit power for an upcoming LTE transmission and a transit power for an upcoming NR transmission. In some cases, the UE may determine whether the combined transmit power exceeds a total power limit or whether there may be a potential of the combined power exceeding the total power limit. Additionally or alternatively, the UE may determine a first power limit for the first aggregated transmit power and a second power limit for the second aggregated transmit power. In some aspects, the UE may then perform the uplink communication with the first group of cells using the first RAT and the uplink communication with the second group of cells using the second RAT. In some cases, the uplink communications may be based on the first power limit, the second power limit, or both.

Aspects of the disclosure are further illustrated by and described with reference to apparatus diagrams, system diagrams, and flowcharts that relate to techniques for dual connectivity power control.

Figure 1:
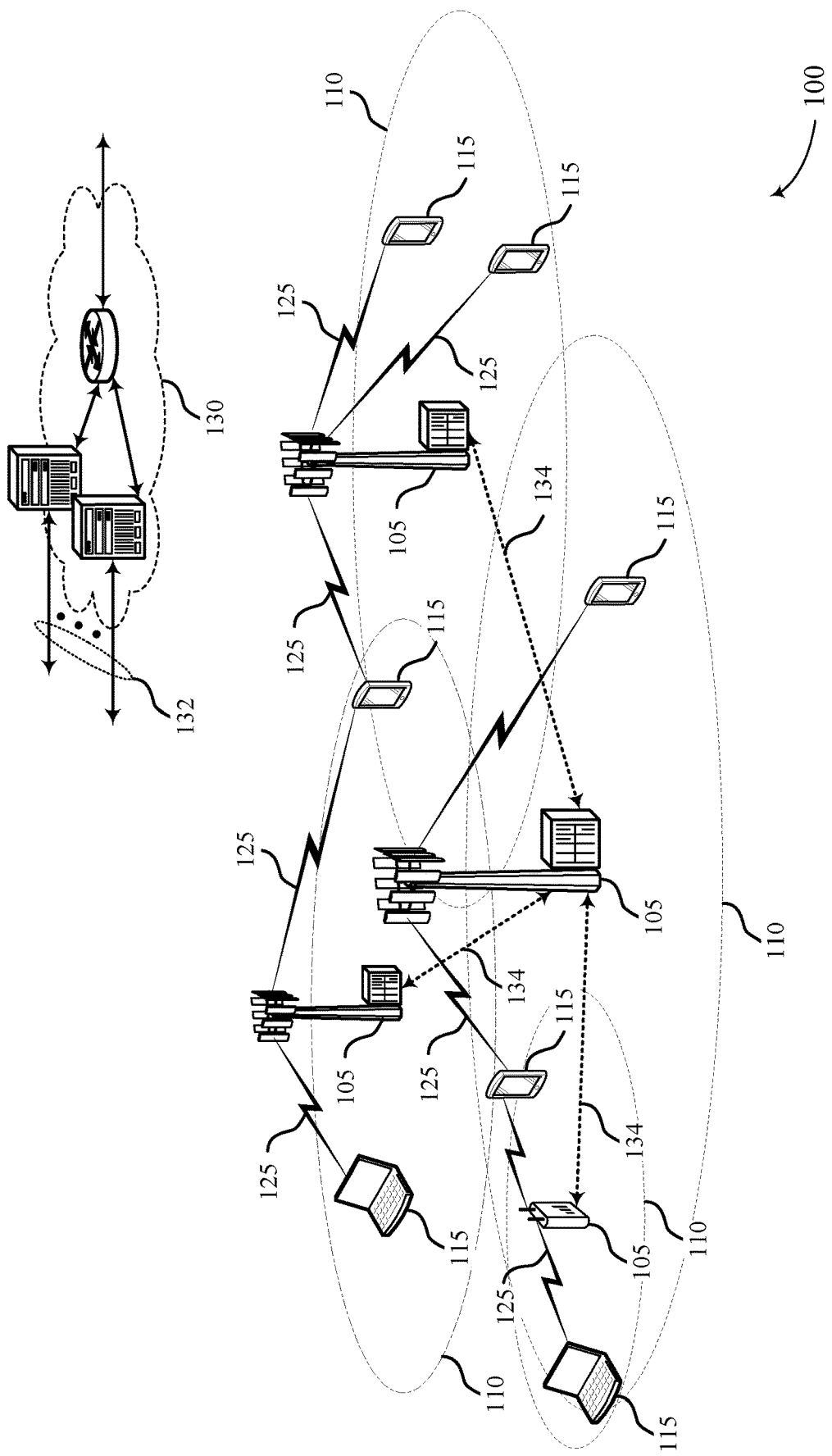
FIG. 1 illustrates an example of a system for wireless communications that supports techniques for dual connectivity power control in accordance with aspects of the present disclosure.

FIG. 1 illustrates an example of a wireless communications system 100 that supports techniques for dual connectivity power control in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or another interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, for example in the range of 300 MHz to 300 GHz. For instance, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), unlicensed radio frequency spectrum band (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission.

Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions.

For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM)

techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support concurrent and/or simultaneous communications via carriers associated with more than one different carrier bandwidth. Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

According to one or more aspects of the present disclosure, the UE 115 may receive a first set of grants for performing uplink transmissions between the UE and a first group of cells associated with a first RAT and a second set of grants for performing uplink communication between the UE and a second group of cells associated with a second RAT. These RATs may include, but are not limited to, the first RAT being a Long Term Evolution (LTE) RAT and the second Rat being an NR RAT. In some cases, the UE 115 may determine that a combined transmit power exceeds a total power limit or that there may be a potential of the combined power exceeding the total power limit, based on the first set of grants and the second set of grants. In some cases, the combined transmit power may include a first aggregated transmit power for the uplink channel using the first RAT and a second aggregated transmit power for the uplink channel using the second RAT. In some cases, the UE 115 may determine at least one of a first power limit for the first aggregated transmit power or a second power limit for the second aggregated transmit power and may perform the uplink communication with the first group of cells using the first RAT and the uplink communication with the second group of cells using the second RAT based on the first power limit, the second power limit, or both.

According to one or more aspects of the present disclosure, the base station 105 may identify at least one of a scheduling delay, a power limit adjustment factor, or a reduced power limit for uplink communication associated with a RAT between the UE 115 and the base station 105. In some cases, the scheduling delay may be based on a UE capability and the RAT may be an NR RAT. In some cases, the base station 105 may transmit a set of grants for performing uplink communication based on the identifying. The set of grants may include at least one of the determined scheduling delay or the determined power limit adjustment factor. In some cases, the base station 105 may then communicate with the UE 115 using the RAT.

Figure 2:
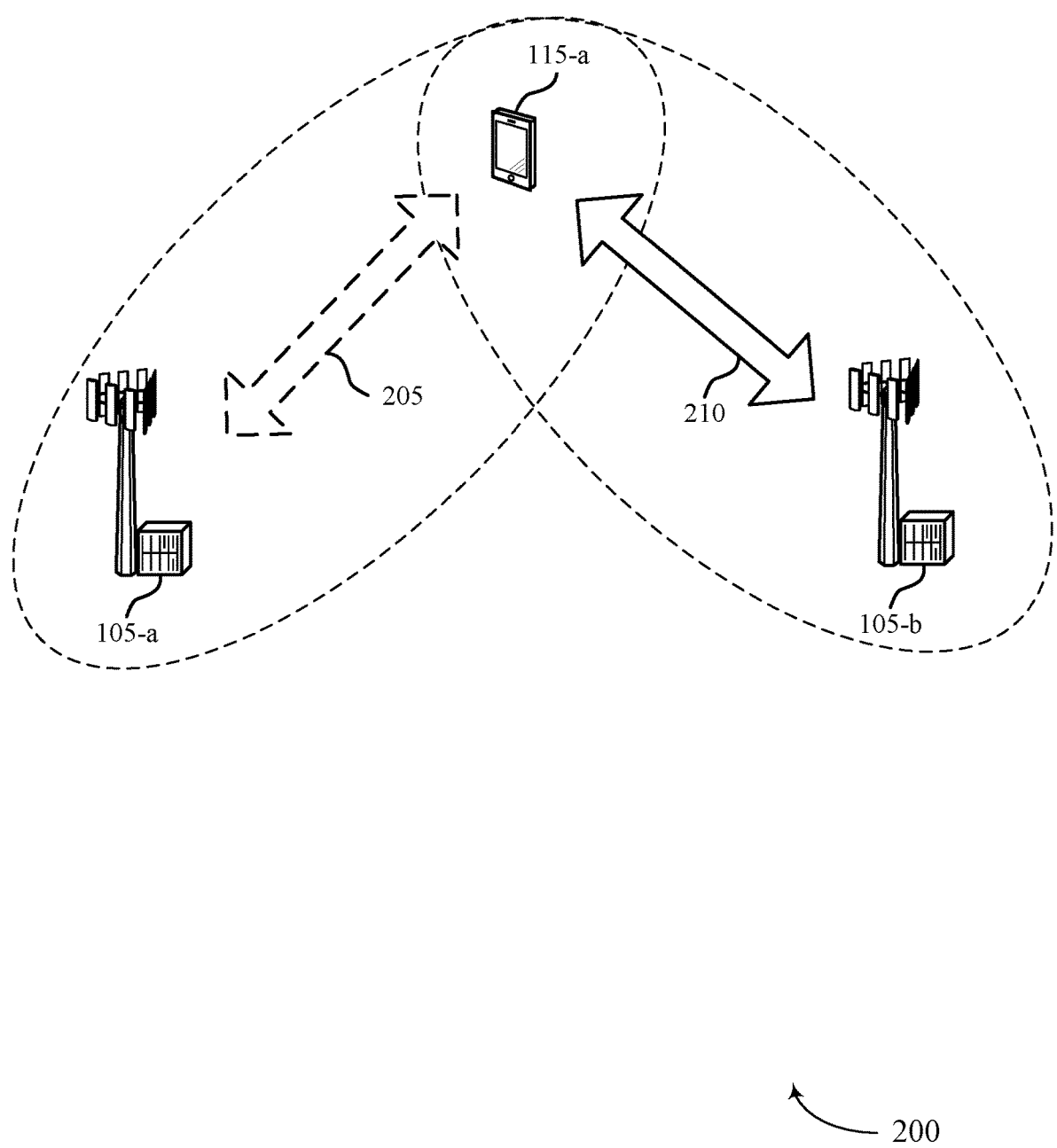
FIG. 2 illustrates an example of a wireless communications system that supports techniques for dual connectivity power control in accordance with aspects of the present disclosure.

FIG. 2 illustrates an example of a wireless communications system 200 that supports techniques for dual connectivity power control in accordance with aspects of the present disclosure. In some examples, wireless communications system 200 may implement aspects of wireless communications system 100. Wireless communications system 200 may include a base station 105-a, a base station 105-b, and a UE 115-a, which may be examples of base stations 105 and UEs 115 as described herein. Base station 105-a may be associated with a first group of cells associated with a first RAT (such as LTE cell group). Base station 105-*b* may be associated with a second group of cells associated with a second RAT (such as NR cell group). According to one or more aspects of the present disclosure, UE 115-*a* may be configured to operate in dual connectivity mode to communicate with base station 105-*a* and base station 105-*b* concurrently and/or simultaneously using aspects of the described power sharing techniques. In some cases base station 105-*a* may be a primary cell of a secondary cell group and base station 105-*b* may be a primary cell of a master cell group. In some cases, UE 115-*a* may be configured to communicate with base station 105-*a* on the secondary cell group using a secondary carrier 205 and may be configured to communicate with base station 105-*b* on the master cell group using a primary carrier 210.

In some aspects, wireless communications system 200 may support aspects of power sharing operations. For example, base station 105-*b* and base station 105-*a* may have limited coordination on the network side. In other examples, base station 105-*b* and base station 105-*a* may have more complex coordination on the network side where dynamic coordination is supported and can be adjusted based on traffic needs. As described herein, UE 115-*a* may receive a first set of grants for performing uplink transmissions between the UE 115-*a* and the first group of cells associated with the first RAT. The UE 115-*a* may also receive a second set of grants for performing uplink communication between the UE 115-*a* and the second group of cells associated with a second RAT.

In some examples, the UE 115-*a* may implement power control for LTE transmissions to base station 105-*a* and for NR transmissions to base station 105-*b*. In some cases, the UE may determine that a combined transmit power exceeds a total power limit or that there may be a potential of the combined power exceeding the total power limit, based on the first set of grants and the second set of grants. For example, the combined transmit power may include a first aggregated transmit power for the LTE uplink channel and a second aggregated transmit power for the NR uplink channel. In some examples, upon determining that the combined transmit power exceeds or has the potential of exceeding the total power limit, the UE 115-*a* may implement power control. Specifically, the UE 115-*a* may determine a first power limit for the first aggregated transmit power and a second power limit for the second aggregated transmit power. In some cases, the first power limit may be configured as a maximum power to be allocated for LTE transmissions and the second power limit may be configured as a maximum power to be allocated for NR transmissions.

In some aspects, UE 115-*a* may determine that it is configured for power sharing for the uplink communications. In some cases, the UE 115-*a* may receive a power limit adjustment factor or a reduced power limit from a network device. In some cases, the power adjustment factor may be used to adjust the first power limit. In some cases, the power adjustment factor may be used to adjust the second power limit. Additionally or alternatively, the power adjustment factor may be used to adjust the total power limit. In some cases, the UE 115-*a* may receive a first power adjustment factor and a second power adjustment factor from one or more network devices (e.g., a same network device, receiving a different power adjustment factor from different devices). In some cases, the first power adjustment factor may be used to adjust the first power limit and the second power adjustment factor may be used to adjust the second power limit.

In some aspects, UE 115-*a* may perform the uplink communications with the base station 105-*a* using the first RAT and the base station 105-*b* using the second RAT based on the first power limit, the second power limit, or both.

Figure 3:
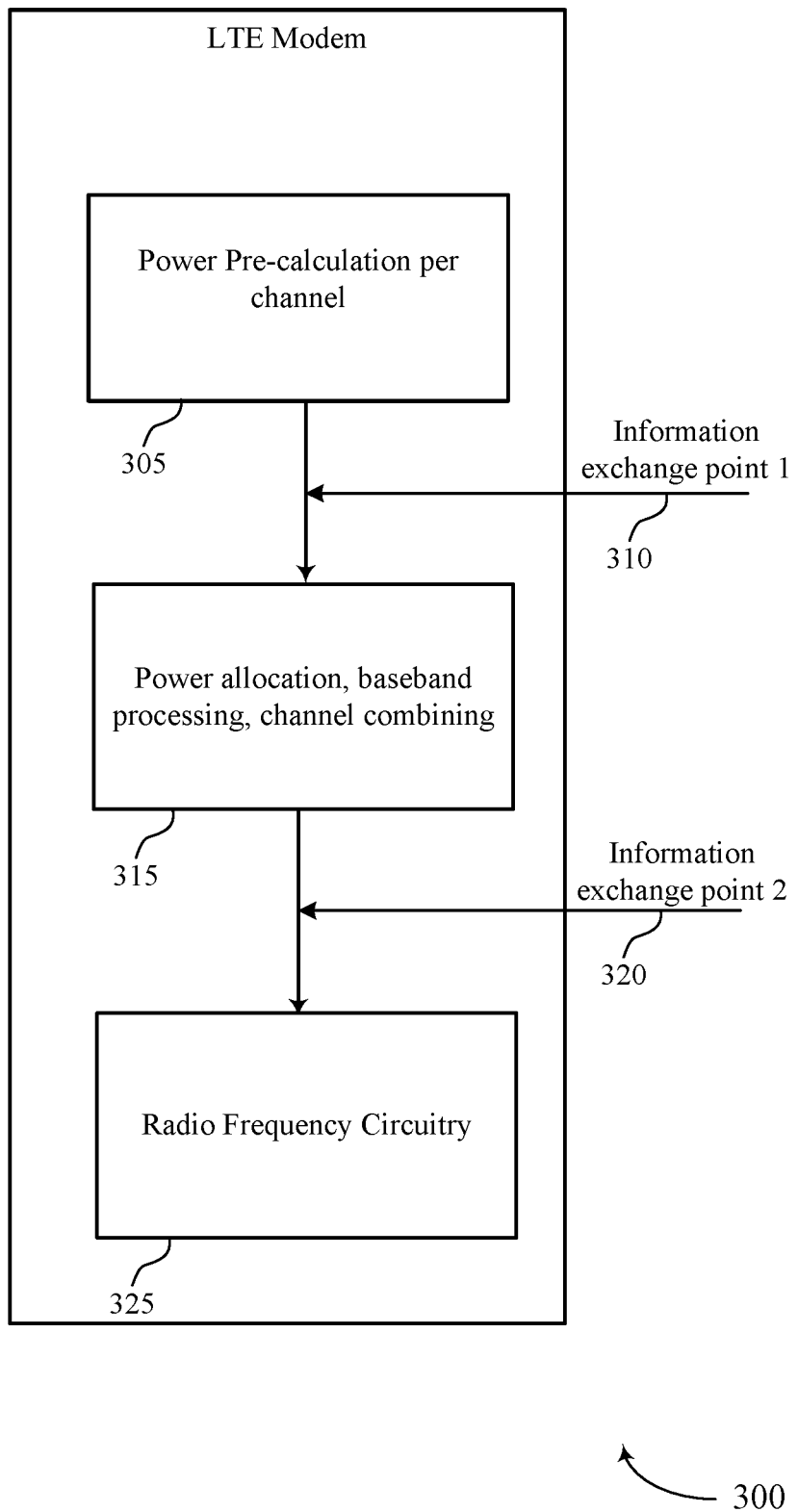
FIG. 3 illustrates an example of a flow diagram that supports techniques for dual connectivity power control in accordance with aspects of the present disclosure.

FIG. 3 illustrates an example of a flow diagram 300 that supports techniques for dual connectivity power control in accordance with aspects of the present disclosure. In some examples, the flow diagram 300 may implement aspects of wireless communications system 100. Specifically, the flow diagram 300 describes an example of an LTE modem for performing dual connectivity power control. Some similar functionality could be performed by a modem associated with a second RAT (e.g., an NR modem) and/or by a network device.

As previously discussed, a UE (such as UE 115-*a*) may be in communication with a first group of cells associated with a first RAT (such as LTE) and the UE may also be in communication with a second group of cells associated with a second RAT (such as NR). In the example architecture of FIG. 3, the second RAT may be a master RAT for implementing dual connectivity techniques. More specifically, in the example of FIG. 3, transmitting data using the second RAT (e.g., NR) may have a higher priority than transmitting data using the first RAT (e.g., LTE). In other examples, such as EN-DC systems, LTE traffic may be prioritized compared to NR traffic.

In LTE systems, a scheduling delay (or latency) may be defined as a time between a grant being transmitted from a base station to a data being transmitted to the base station. In some LTE systems, the latency value may be fixed. In some cases, the latency value may be greater than or equal to 4 milliseconds. In one example, a UE communicating with a cell group associated with LTE, may receive a grant and may determine a time for data transmission based on the received grant. In some cases, upon receiving the grant, the UE may schedule the uplink transmission after 4 subframes. For some UEs employing TDD, a network device may provide the UE with a table for each uplink/downlink communication.

In some systems related to a first RAT (e.g., NR), however, a minimum scheduling delay (such as a minimum latency between the time of receiving the grant and the uplink transmission) may be less than a scheduling delay associated with transmissions related to a second RAT (e.g., LTE). In some cases, the minimum scheduling delay in some systems (e.g., NR systems) may be based on a UE capability.

In some cases, the scheduling delay in NR systems may be based on subcarrier spacing. For example, for NR systems having subcarrier spacing of 15 KHz, a minimum scheduling delay may be 1 millisecond, and for NR systems having subcarrier spacing of 30 KHz, a minimum scheduling delay may be 0.5 milliseconds. Thus in NR systems, although there may be a minimum value for scheduling delay for each UE, the minimum value for scheduling delay may be less than the value for scheduling delay in other systems (e.g., LTE systems).

Additionally, NR systems may also support dynamic scheduling delays. More specifically, although a UE communicating with an NR base station may support a minimum value for a scheduling delay, an actual scheduling delay may be configured (e.g., by a network device). In some cases, an NR base station may be configured to indicate a scheduling delay for an upcoming NR communication (e.g., in a downlink control indicator (DCI)). The UE may receive a grant associated with performing uplink communications using NR RAT, and may determine a timing for the uplink communications based on decoding the DCI from the received grant. Thus, for NE-DC systems where NR is given a higher priority, there exists a need for efficient power sharing between the first group of cells associated with the first RAT (e.g., cell group associated with LTE) and the second group of cells associated with the second RAT (e.g., a cell group associated with NR).

In the example of FIG. 3, the LTE modem in the UE may receive a DCI as part of an LTE grant (e.g., the first grant). The LTE modem may then decode the received grant to identify a DCI. Upon identifying the DCI, at 305, the LTE modem may perform a power pre-calculation per channel. At 315, the LTE modem may perform power allocation based on the channel. For example, the LTE modem may allocate transmit power for each channel communicating using LTE RAT. The LTE modem may then perform base band processing and send the processed signal to the Radio Frequency (RF) circuitry 325.

In some existing systems, due to a difference in the support of scheduling delays, when a UE receives a first grant associated with the first RAT (such as an LTE grant) and determines an uplink data based on the first grant, the UE may not have any knowledge of an upcoming communication associated with the second RAT (such as an NR RAT). This results in inefficient power sharing between cell groups associated with the first RAT (e.g., LTE) and cell groups associated with the second RAT (e.g., NR).

To achieve efficient power control for supporting LTE and NR RATs, the LTE modem may receive information related to NR at either a first information exchange point 310 or a second information exchange point 320. In some examples, if the channel information including power information associated with the upcoming NR transmission(s) that overlaps with the upcoming LTE transmission is available at the first information exchange point 310, then the power allocation for the first RAT (e.g., an LTE RAT) may be performed at a channel level by taking the power information for the upcoming transmission associated with a second RAT (e.g., an NR RAT) into consideration.

As another example, if the channel information or power information associated with the upcoming NR transmission(s) is available at the second information exchange point 320, then a total allocated LTE power may be adjusted. In one example, if the power information associated with the upcoming NR transmission is received at the second information exchange point 320, an upcoming LTE transmission may be scaled, dropped or stopped. In some cases, an information exchange at the first information exchange point 310 may allow power allocation on a per channel basis and may entail different (e.g., greater) scheduling delays for the upcoming NR transmissions. On the other hand, information exchange at the second information exchange point 320, may entail an overall scaling of data for an upcoming LTE transmission instead of per channel scaling. In some cases, the information exchange at the second information exchange point 320 may allow for different (e.g., lesser) scheduling delays. In one example, the information exchange at the second information exchange point 320 may be 1 millisecond before the beginning of the LTE transmission (such as 1 millisecond before the LTE slot start time).

In some examples, the UE may determine a first aggregated transmit power for the uplink channel using the first RAT (such as an LTE RAT) and a second aggregated transmit power for the uplink channel using the second RAT (such as an NR RAT). The UE may also configure a first power limit (e.g., p_LTE) for the first aggregated transmit power and a second power limit (e.g., p_NR) for the second aggregated transmit power. For example, p_LTE may be the maximum power configured for the UE for performing uplink communications with a first cell group associated with LTE, and p_NR may be the maximum power configured for the UE for performing uplink communications with a second cell group associated with NR.

In some cases, the UE may determine whether a combined transmit power exceeds a total power limit or may have a potential of exceeding a total power limit (e.g., p_total). For example, the UE first determines p_LTE_actual as the smaller of the required power and p_LTE, and p_NR_actual as the smaller of the required power and p_NR, and then determines whether the combined transmit power exceeds p_total or has the potential of exceeding p_total (e.g., p_LTE_actual+p_NR_actual>p_total). In some examples, the total power limit may be configured by the network. If the UE determines that the combined transmit power exceeds the total power limit or may have the potential of exceeding the total power limit at the second information exchange point 320, then the UE may stop, completely drop, or scale down the total power of the uplink channels with the first cell group associated with LTE.

In some cases, as previously discussed, the UE may receive a first set of grants associated with uplink communications with the first cell group associated with LTE. Upon receiving the first grant, the UE may decode the first set of grants (such as DCIs) to determine the channel types and resource allocations, and may perform a power allocation for the uplink channels with the first cell group. In some cases, because LTE may have a higher scheduling delay when compared to NR, the UE may perform a power allocation for uplink communications with the first cell group (LTE cell group) before receiving all of the second set of grants associated with uplink channels with the second cell group associated with NR. In some cases, to be able to make information about an upcoming NR transmission available to the LTE modem at the first information exchange point 310, a UE may support a greater scheduling delay for uplink communications using NR.

In one example, the UE may transmit an indication of a UE capability to a network of the second RAT (e.g., an NR RAT). In some cases, the UE may indicate a minimum scheduling delay for performing a power adjustment of the first RAT (e.g., an LTE RAT) based on concurrently and/or simultaneously performing the uplink communication with the second group of cells using the second RAT (e.g., an NR RAT). For example, the UE may indicate a latest time for handling reception of an NR grant, before an upcoming transmission associated the first RAT (e.g., an LTE channel). In one example, the UE may indicate that it is configured to handle reception of an NR grant 1 millisecond before an upcoming transmission associated the first RAT. In some cases, a base station associated with the first RAT (such as an LTE base station) may signal the indication from the UE to the base station associated with the second RAT (such as an NR base station). The NR base station may then determine one or more values for scheduling delay in the grants (such as NR grant) for performing uplink communication between the UE and the second group of cells associated with the second RAT. For example, the NR base station may determine k1 and k2 values for the scheduling delay of HARQ-ACK and uplink data, respectively, and may then indicate then k1 and k2 values in a DCI.

In some cases, the NR scheduling delay may be configured to be greater than or equal to a predefined value. For example, the NR scheduling delay may be configured to be greater than or equal to 4 milliseconds. In such cases, the UE may receive a DCI associated with an upcoming transmission using the second RAT (such as an NR RAT) before receiving a DCI associated with an upcoming transmission using the first RAT (such as an LTE RAT). Thus, the UE may be able be provide information associated with an upcoming NR transmission to the LTE modem at the first information exchange point 310.

In some cases, the UE may receive information identifying a mapping between a scheduling delay of the second RAT (such as an NR RAT) and a scheduling delay command field in the DCI for the second RAT. In some cases, the mapping may be included in a table (e.g., a table including 8 entries). In some cases, the UE may modify an existing mapping based on the UE capability. For example, the UE may modify the existing mapping by adding a fixed offset to the existing mapping. As an example, a value of k2=0 may indicate that an uplink channel is scheduled for the same slot in which k2 was received. In some cases, the UE may be configured to add an offset such that a value of k2=0 may indicate that an uplink channel is scheduled for the third slot from the slot in which k2 was received.

In some cases, however, the UE may prioritize uplink communications using the second RAT (such as an NR RAT) and may always drop the uplink communications using the first RAT (such as an LTE transmissions). Thus, a flexible solution for dynamic power sharing is described.

Figure 4:
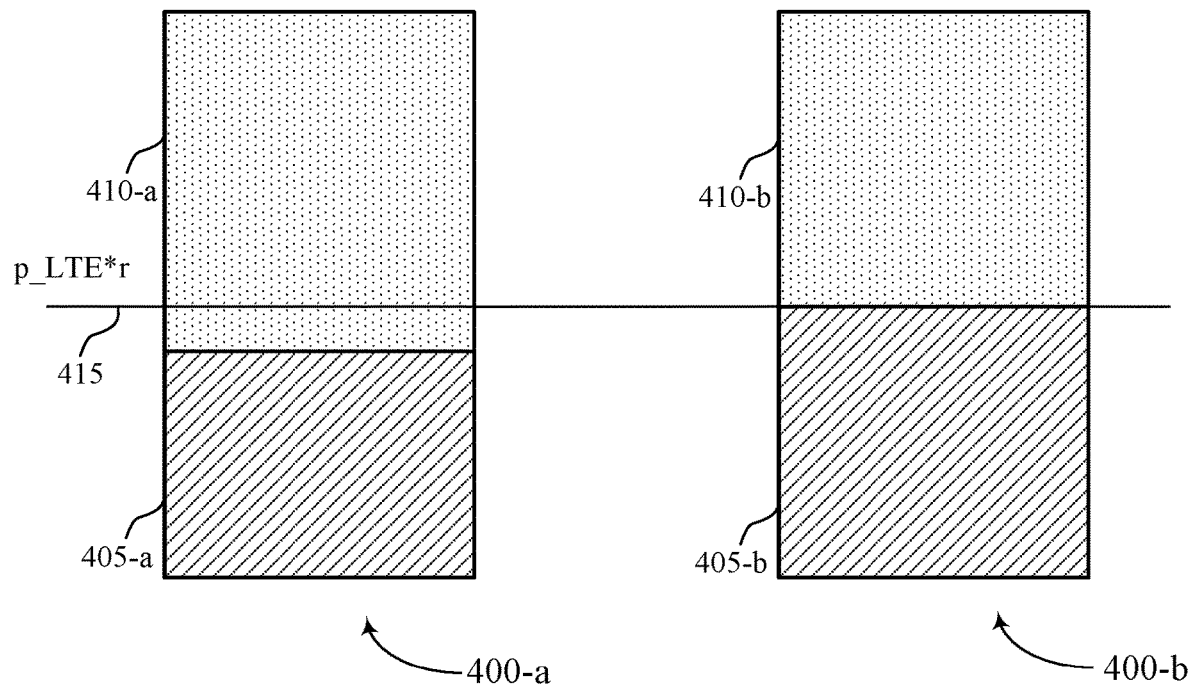
FIG. 4 illustrates examples of dynamic power sharing techniques that support techniques for dual connectivity power control in accordance with aspects of the present disclosure.

FIG. 4 illustrates examples of dynamic power sharing techniques 400-a and 400-b that support techniques for dual connectivity power control in accordance with aspects of the present disclosure. In some examples, the dynamic power sharing techniques 400-a and 400-b may implement aspects associated with wireless communications system 100.

As previously described, a UE (such as UE 115 or UE 115-a) may be configured to operate in dual connectivity to concurrently and/or simultaneously communicate with a first base station associated with a first RAT (such as an LTE base station) and a second base station associated with a second RAT (such as an NR base station) using aspects of the described power sharing techniques. In some cases, the UE may receive a power limit adjustment factor (e.g., an adjustment factor "r") or a reduced power limit for the uplink communication associated with the first RAT. For example, the adjustment factor "r" may be used to potentially adjust a power limit of an uplink channel associated with the first RAT.

Upon receiving the power limit adjustment factor or the reduced power limit, the UE may determine a first power limit based on p_LTE (as discussed with reference to FIG. 3) and the power limit adjustment factor. For example, the configured power limit for LTE transmissions may be p_LTE or p_LTE*r depending on if there may be a potential overlapping uplink transmission of the second RAT. In some cases, the configured adjustment factor may be applied to the total power limit. For example, the configured power limit for LTE transmissions may be p_LTE or p_total*r depending on if there may be a potential overlapping uplink transmission of the second RAT. In some cases, the UE may configure a second power limit p_NR for uplink communications using the second RAT (such as communications using an NR RAT). In some cases, a value of the power limit adjustment factor may be less than or equal to 1.

In some cases, the UE may determine whether a combined transmit power limit exceeds a total power limit (e.g., p_LTE+p_NR>p_total). The UE may then determine if there may be a potential uplink transmission(s) using the second RAT that may overlap with a transmission using the first RAT. In some cases, the UE may determine that a subframe for an upcoming communication using the first RAT (such as an LTE subframe) overlaps with a potential uplink symbol for an upcoming communication using the second RAT (such as an NR symbol). In some cases, a symbol associated with the NR cell group may be determined as the one or more potential uplink symbols for an upcoming communication based on the symbol being configured as an uplink symbol (or flexible symbol) for at least one cell of the second group of cells.

In some examples, a dynamic slot format indicator (SFI) included in a DCI format (such as DCI format 2_0) in NR can be used by UE in determining if a symbol is a potential uplink symbol for the second RAT. The SFI in the DCI identifies the formats of each symbol within a time period. A symbol can be identified as DL (for downlink), UL (for uplink), X (for flexible). In some cases, the dynamic SFI may be applied with a time shift in determining potential uplink symbols in dynamic power sharing. In some cases, the time shift may be 4 milliseconds. In some examples, the formats of the slots for NR transmission may be considered effective in determining potential uplink symbols for dynamic power sharing starting from a pre-defined time after the actual start time of the DCI effective period. For example, if a time shift "D" is determined, either signaled to a UE and predefined by specification, an SFI effective from time "t" to time "t+P" for NR transmission may be considered in determining potential uplink symbols for dynamic power sharing in the period from time "t+D" to time "t+P."

In cases where the UE detects a potential overlap, the UE may adjust the first power limit (such as a power limit for LTE transmissions) and the second power limit (such as a power limit for NR transmissions). In some cases, the first power limit may be adjusted to a power level (e.g., p_LTE*r or p_total*r). For example, a maximum transmit power for LTE transmissions (e.g., Pcmax_LTE) may be set to the power level (e.g., p_LTE*r). In such cases, the power limit for NR transmissions may be a minimum of the second power limit (such as p_NR as described with reference to FIG. 3) and a difference between the total power limit (such as p_total) and a transmit power of an overlapping transmission of the first RAT (such as p_LTE_actual). For example, in cases of an overlap, the adjusted second power limit may be calculated as Pcmax_NR=min (p_NR, p_total−p_LTE_actual). More specifically, the second power limit for NR transmissions (e.g., Pcmax_NR) may include a remaining power up to the second power limit p_NR.

As described in FIG. 4, the UE may calculate a power 405 allocated for an upcoming LTE transmission and a power 410 allocated for an upcoming NR transmission. The UE may determine that a subframe for an upcoming communication using the LTE RAT overlaps with at least one potential uplink symbol for an upcoming communication using the NR RAT. The UE may then set a power limit 415 for the LTE transmission Pcmax_LTE to p_LTE*r. In some cases, the UE may determine that a power 405-a allocated for an upcoming LTE transmission is less that Pcmax_LTE (e.g., power 405-a<p_LTE*r). In such cases, the UE may allocate the remaining power 410-a for the upcoming NR transmission. In another example, the UE may determine that a power allocated for an upcoming LTE transmission is greater that Pcmax_LTE (e.g., power allocated for an upcoming LTE transmission>P_LTE*r). In such cases, the UE may allocate a power 405-b up to Pcmax_LTE (e.g., power 405-b=p_LTE*r) and may allocate the remaining power 410-b for the upcoming NR transmission. In some cases, for NR transmission, the UE may initially perform a cell group level of power sharing and may then perform channel power sharing independently within each cell group.

In some cases, if the UE determines that the upcoming transmission includes at least one Physical Random Access Channel (PRACH) (such as a first PRACH associated with a primary cell of the first RAT and a second PRACH associated with a primary cell of the second RAT), then the UE may allocate a first power to the first PRACH up to a first power limit (such as p_LTE) and may allocate a second power to the second PRACH up to a second power limit (such as p_NR). In some cases, the UE may allocate the first power and the second power and drop other overlapping channels. In other cases, the UE may allocate the first power and the second power and allocate the remaining to other overlapping channels. In some example, the UE may determine that a transmission of the first PRACH collides with a transmission of the second PRACH. In such cases, the earlier transmitted PRACH may take the higher priority than the later transmitted PRACH. Alternatively, in some cases, the second PRACH (such as an NR PRACH) may take a higher priority than the first PRACH (such as an LTE PRACH) and the NR PRACH may be allocated power before allocating remaining power to the LTE PRACH. In some cases, after allocating powers to the first PRACH and the second PRACH, any remaining power may be allocated to other, remaining transmissions.

Figure 5:
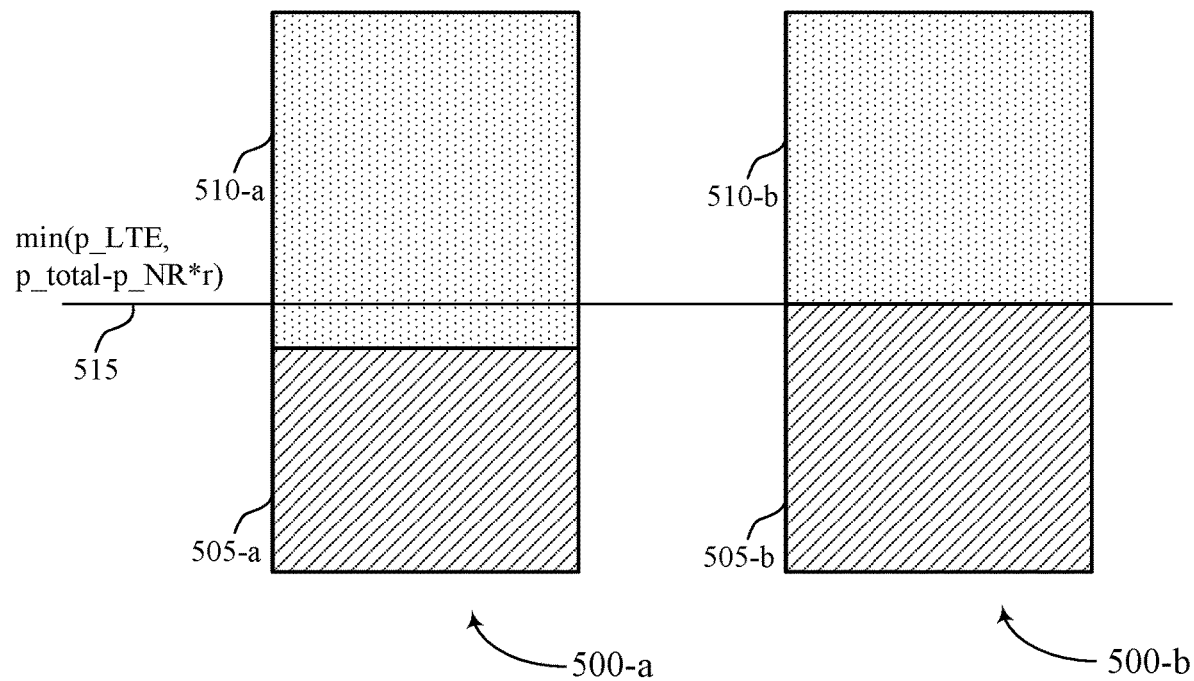
FIG. 5 illustrates examples of dynamic power sharing techniques that support techniques for dual connectivity power control in accordance with aspects of the present disclosure.

FIG. 5 illustrates examples of dynamic power sharing techniques 500-a and 500-b that supports techniques for dual connectivity power control in accordance with aspects of the present disclosure. In some examples, the dynamic power sharing techniques 500-a and 500-b may implement aspects of wireless communications system 100.

A UE (such as UE 115 or UE 115-a) may be configured to operate in dual connectivity to concurrently and/or simultaneously communicate with a first group of cells associated with a first RAT (such as an LTE cell group) and a second group of cells associated with a second RAT (such as an NR cell group) using aspects of the described power sharing techniques. In some cases, the UE may receive a power limit adjustment factor (e.g., a power limit adjustment factor "r") or a reduced power limit for the uplink communication associated with the second RAT.

Upon receiving the power limit adjustment factor, the UE may configure a second power limit based on p_NR (as discussed with reference to FIG. 3) and the power limit adjustment factor). For example, the configured power limit for NR transmissions may be p_NR*r. In some cases, the UE may configure a first power limit (e.g., p_LTE) for uplink communications using the first RAT (such as communications using LTE RAT). In some cases, a value of the power limit adjustment factor (e.g., a power limit adjustment factor "r") may be less than or equal to 1.

In some cases, the UE may determine whether a combined transmit power limits exceeds a total power limit (e.g., p_total). More specifically, the UE may combine p_LTE and p_NR*r and may determine whether the combined transmit power limits exceeds p_total (e.g., p_LTE+p_NR*r>p_total). The UE may then determine whether the uplink communication with the first group of cells (such as cells associated with LTE) will or does overlap in time with one or more potential uplink symbols associated with the second group of cells (such as cells associated with NR).

Upon detecting an overlap, the UE may be configured to adjust the first power limit (such as power limit for LTE transmissions) and the second power limit (such as power limit for NR transmissions). In some cases, the first power limit may be adjusted to a minimum of the first power limit and a difference between the total power limit and the adjusted second power limit. For example, a maximum transmit power for LTE transmissions (e.g., Pcmax_LTE) may be set to a minimum of two other power levels (e.g., min(p_LTE, p_total−p_NR*r)). Additionally, the power limit for NR transmissions may be a minimum of the second power limit (such as p_NR as described with reference to FIG. 3) and a difference between the total power limit (such as p_total) and a transmit power of the first RAT (p_LTE_actual). For example, in cases of an overlap, the adjusted second power limit may be calculated as Pcmax_NR=min (p_NR, p_total−p_LTE_actual). More specifically, the second power limit Pcmax_NR for NR transmissions may include a remaining power up to the second power limit p_NR.

In some cases, the UE may calculate a power 505 allocated for an upcoming LTE transmission and a power 510 allocated for an upcoming NR transmission. The UE may determine that a subframe for an upcoming communication using the LTE RAT overlaps with a potential uplink symbol for an upcoming communication using the NR RAT. The UE may then set a power limit 515 for the LTE transmission Pcmax_LTE to min(p_LTE, p_total−p_NR*r). In some cases, the UE may determine that a power 505-a allocated for an upcoming LTE transmission is less that Pcmax_LTE, and may allocate the remaining power 510-a for the upcoming NR transmission. In another example, the UE may determine that a power allocated for an upcoming LTE transmission is greater that Pcmax_LTE, and may allocate a power 505-b up to Pcmax_LTE and may allocate the remaining power 510-b for the upcoming NR transmission.

Figure 6:
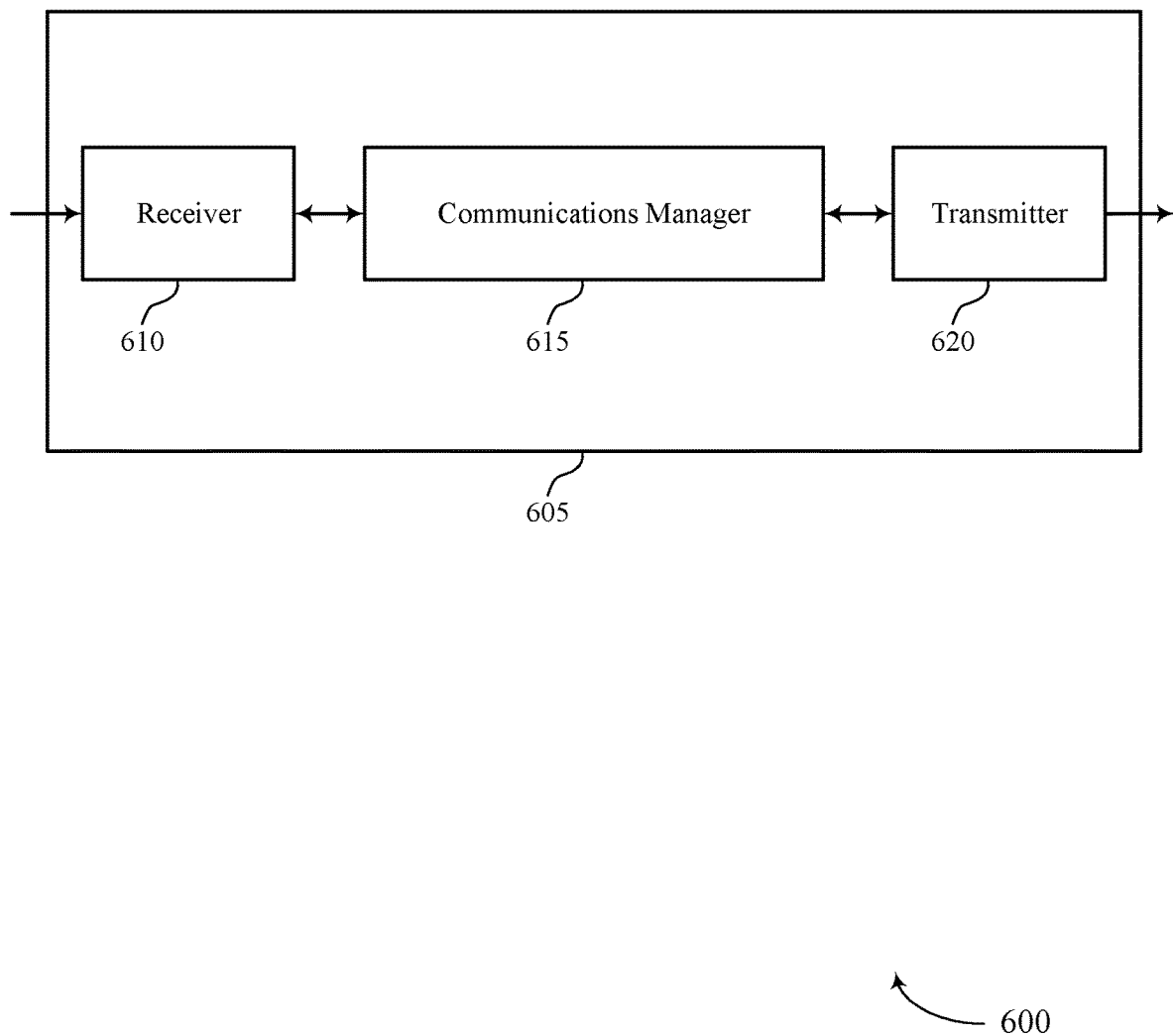
FIGS. 6 and 7 show block diagrams of devices that support techniques for dual connectivity power control in accordance with aspects of the present disclosure.

FIG. 6 shows a block diagram 600 of a device 605 that supports techniques for dual connectivity power control in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for dual connectivity power control, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a first set of grants for performing uplink transmissions between the UE and a first group of cells associated with a first RAT and a second set of grants for performing uplink communication between the UE and a second group of cells associated with a second RAT, the second RAT being an NR RAT, determine that a combined transmit power exceeds a total power limit or that there may be a potential of the combined power exceeding the total power limit, based on the first set of grants and the second set of grants, the combined transmit power including a first aggregated transmit power for the uplink channel using the first RAT and a second aggregated transmit power for the uplink channel using the second RAT, determine at least one of a first power limit for the first aggregated transmit power or a second power limit for the second aggregated transmit power, and perform the uplink communication with the first group of cells using the first RAT and the uplink communication with the second group of cells using the second RAT based on the first power limit, the second power limit, or both. The communications manager 615 may be an example of aspects of the communications manager 1015 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
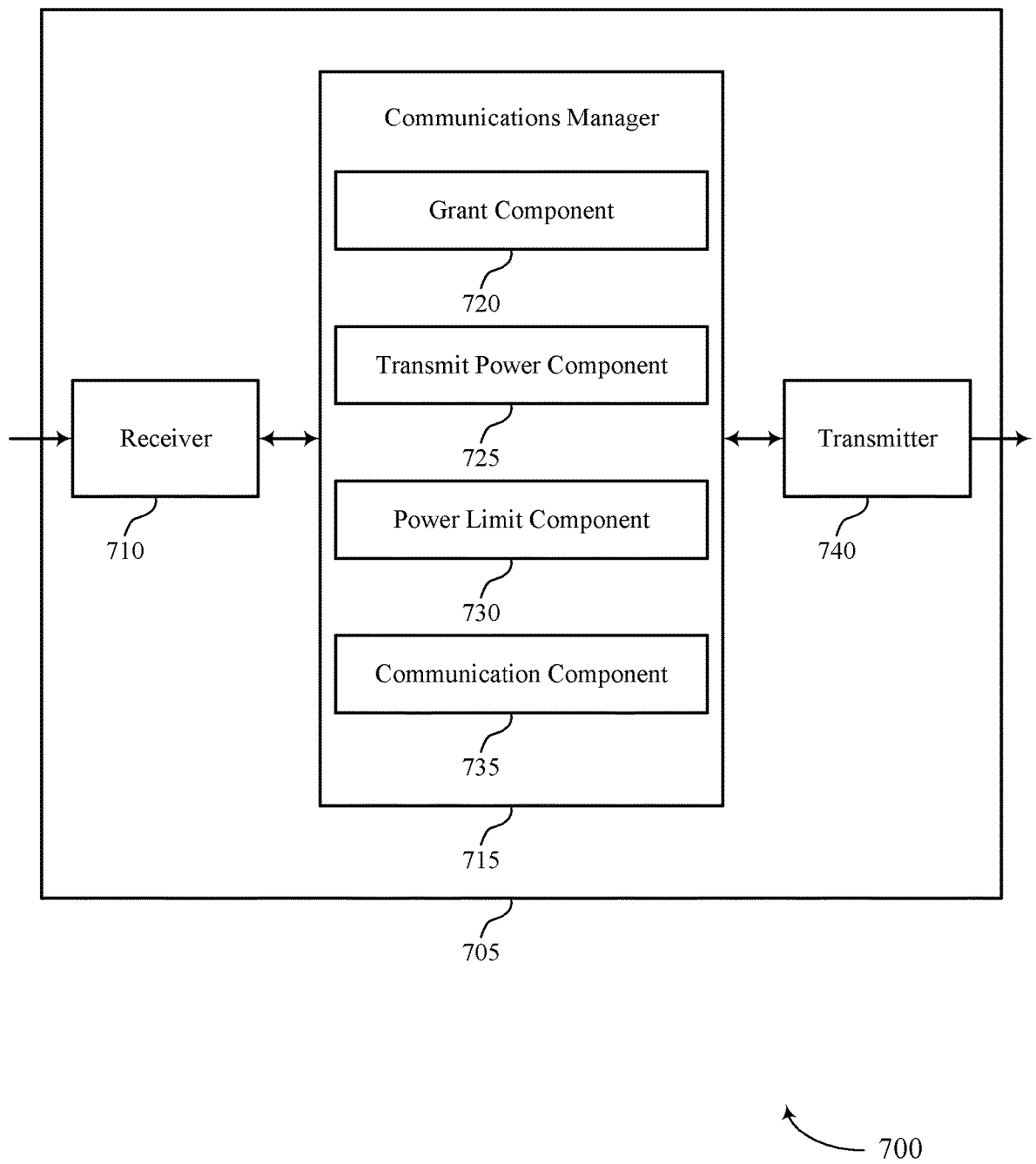

FIG. 7 shows a block diagram 700 of a device 705 that supports techniques for dual connectivity power control in accordance with aspects of the present disclosure. The device 705 may be an example of aspects of a device 605 or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to techniques for dual connectivity power control, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a grant component 720, a transmit power component 725, a power limit component 730, and a communication component 735. The communications manager 715 may be an example of aspects of the communications manager 1015 described herein.

The grant component 720 may receive a first set of grants for performing uplink transmissions between the UE and a first group of cells associated with a first RAT and a second set of grants for performing uplink communication between the UE and a second group of cells associated with a second RAT, the second RAT being an NR RAT.

The transmit power component 725 may determine that a combined transmit power exceeds a total power limit or that there may be a potential of the combined power exceeding the total power limit, based on the first set of grants and the second set of grants, the combined transmit power including a first aggregated transmit power for an uplink channel using the first RAT and a second aggregated transmit power for an uplink channel using the second RAT.

The power limit component 730 may determine at least one of a first power limit for the first aggregated transmit power or a second power limit for the second aggregated transmit power. The communication component 735 may perform the uplink communication with the first group of cells using the first RAT and the uplink communication with the second group of cells using the second RAT based on the first power limit, the second power limit, or both.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
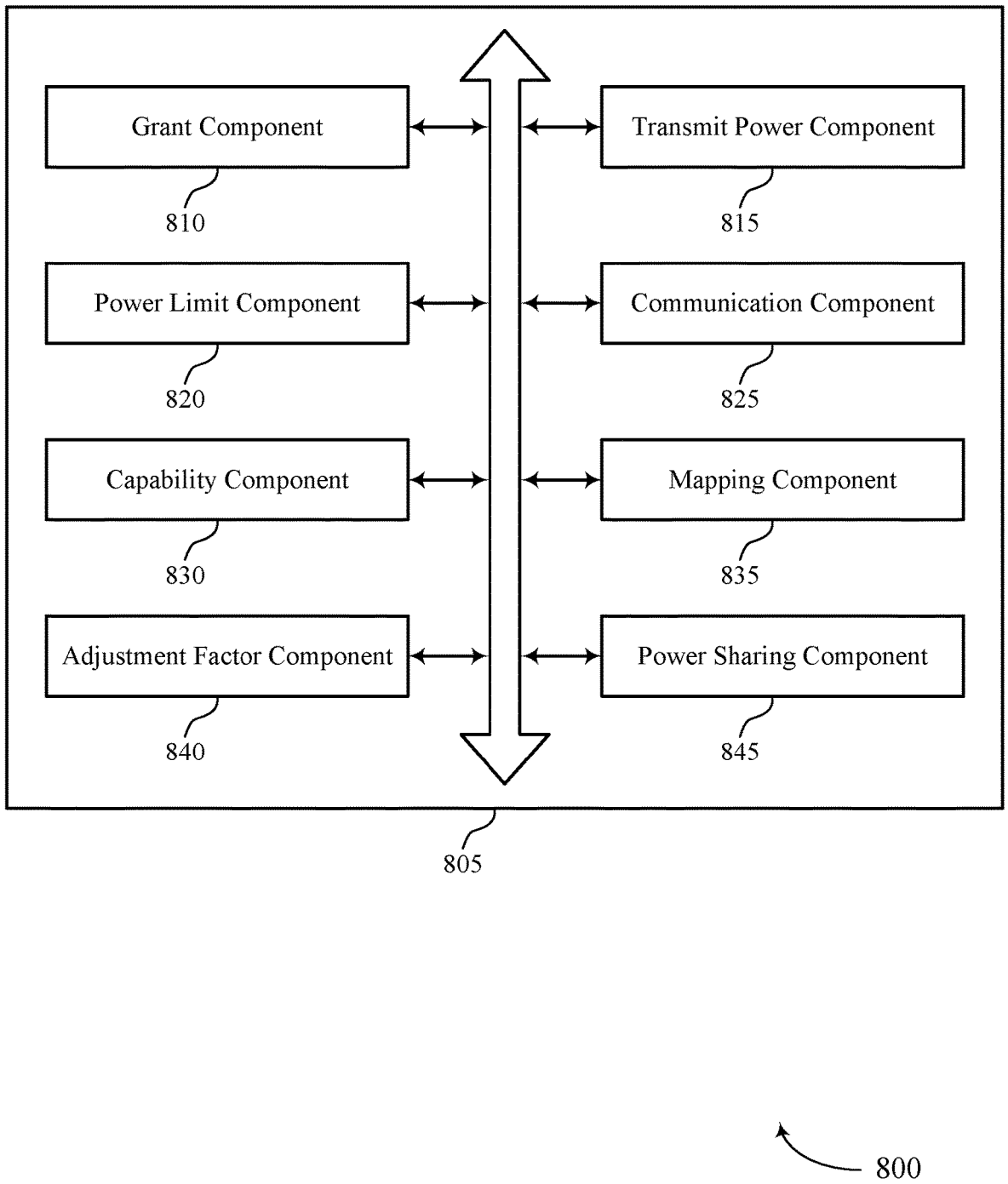
FIG. 8 shows a block diagram of a communications manager that supports techniques for dual connectivity power control in accordance with aspects of the present disclosure.

FIG. 8 shows a block diagram 800 of a communications manager 805 that supports techniques for dual connectivity power control in accordance with aspects of the present disclosure. The communications manager 805 may be an example of aspects of a communications manager 615, a communications manager 715, or a communications manager 1015 described herein. The communications manager 805 may include a grant component 810, a transmit power component 815, a power limit component 820, a communication component 825, a capability component 830, a mapping component 835, an adjustment factor component 840, and a power sharing component 845. Each of these modules may communicate, directly or indirectly, with one another (e.g., via one or more buses).

The grant component 810 may receive a first set of grants for performing uplink transmissions between the UE and a first group of cells associated with a first RAT and a second set of grants for performing uplink communication between the UE and a second group of cells associated with a second RAT, the second RAT being an NR RAT. In some examples, the grant component 810 may receive a dynamic SFI included in a DCI format identifying formats of one or more symbols within a period of time starting from a first time to a second time for one or more of the second group of cells associated with the second RAT, where formats of one or more slots are considered effective in determining the one or more potential uplink symbols starting from a pre-defined time after the first time and ending at the second time. In some cases, a scheduling delay of the second RAT is greater than or equal to a minimum scheduling delay of the first RAT. In some cases, a scheduling delay of the second RAT is greater than or equal to four milliseconds or a predefined value. In some cases, the first RAT is a LTE RAT.

The transmit power component 815 may determine that a combined transmit power exceeds a total power limit or that there may be a potential of the combined transmit power exceeding the total power limit, based on the first set of grants and the second set of grants, the combined transmit power including a first aggregated transmit power for an uplink channel using the first RAT and a second aggregated transmit power for an uplink channel using the second RAT.

In some examples, the transmit power component 815 may allocate a transmit power needed for the first PRACH based on the first power limit. In some examples, the transmit power component 815 may allocate a transmit power needed for the second PRACH based on the second power limit. In some examples, the transmit power component 815 may allocate a remaining power to one or more overlapping channels. In some examples, allocating the transmit power needed for the first PRACH includes determining a difference between the total power limit and the allocated transmit power needed for the second PRACH, and allocating the transmit power needed for the first PRACH by allocating a minimum of the transmit power needed for the first PRACH and the determined difference. In some cases, a transmit power of the second RAT is unchanged and a transmit power of the first RAT is reduced, where a sum of the transmit power of the first RAT and the transmit power of the second RAT does not exceed the total power limit.

The power limit component 820 may determine at least one of a first power limit for the first aggregated transmit power or a second power limit for the second aggregated transmit power. In some examples, the power limit component 820 may adjust the first power limit based on the power limit adjustment factor or the reduced power limit. In some examples, the power limit component 820 may determine that the first power limit is adjusted based on the power limit adjustment factor or the reduced power limit and determining that the uplink transmissions associated with the first group of cells overlaps in time with the one or more potential uplink symbols associated with the second group of cells.

In some examples, the power limit component 820 may adjust the second power limit based on the second power limit, the total power limit, and the determined transmit power of the first RAT. In some examples, the power limit component 820 may determine a difference between the total power limit and a transmit power of the first RAT, where the transmit power of the first RAT is based on the adjusted first power limit.

In some examples, the power limit component 820 may adjust the second power limit to be a minimum of the second power limit of the second RAT and the determined difference. In some examples, the power limit component 820 may adjust the total power limit based on the power limit adjustment factor or the reduced power limit. In some examples, the power limit component 820 may adjust the second power limit based on the power limit adjustment factor or the reduced power limit. In some examples, the power limit component 820 may adjust the first power limit based on the first power limit, the adjusted second power limit, and the total power limit. In some examples, the power limit component 820 may determine a difference between the total power limit and the adjusted second power limit. In some examples, the power limit component 820 may adjust the first power limit to be a minimum of the first power limit of the first RAT and the determined difference.

The communication component 825 may perform the uplink communication with the first group of cells using the first RAT and the uplink communication with the second group of cells using the second RAT based on the first power limit, the second power limit, or both. In some examples, the communication component 825 may determine that a sum of the first power limit of the first RAT and the second power limit of the second RAT exceeds the total power limit. In some cases, the communication component 825 may determine that the sum of the first power limit of the first RAT and the second power limit of the second RAT may have the potential of exceeding the total power limit, and uplink transmissions associated with the first group of cells overlaps in time with one or more potential uplink symbols associated with the second group of cells.

In some examples, the communication component 825 may determine that no potential uplink symbol associated with the second RAT is present in a slot of an uplink communication with the first RAT based on the formats of the one or more slots. In some examples, the communication component 825 may perform the uplink communication with the first RAT based on the first power limit. In some examples, determining that an upcoming transmission includes a first PRACH associated with a primary cell of the first RAT and a second PRACH associated with a primary cell of the second RAT.

In some examples, the communication component 825 may determine that a transmission of the first PRACH collides with a transmission of the second PRACH. In some examples, the communication component 825 may determine that no potential uplink symbol associated with the second RAT is present in a slot of an uplink communication with the first RAT. In some examples, the communication component 825 may perform the uplink communication with the first group of cells using the first RAT based on the first power limit. In some examples, the communication component 825 may selectively perform the uplink communication with the first group of cells associated with the first RAT based on the determined first power limit. In some cases, a symbol associated with the second group of cells is determined as the one or more potential uplink symbols based on the symbol being configured as an uplink symbol or a flexible symbol for at least one cell of the second group of cells.

The capability component 830 may transmit an indication of a UE capability to a network of the second RAT, where the indication of the UE capability includes a minimum scheduling delay for performing a power adjustment of the first RAT based on performing the uplink communication with the second group of cells using the second RAT. The mapping component 835 may receive information identifying a mapping between a scheduling delay of the second RAT and a scheduling delay command field in a DCI for performing the uplink communication with the second group of cells associated with the second RAT. The mapping component 835 may modify an existing mapping based on the transmitted UE capability, where performing the uplink communication with the second group of cells associated with the second RAT is based on the modified mapping.

In some examples, the mapping component 835 may modify an existing mapping based on the transmitted UE capability, where performing the uplink communication with the second group of cells associated with the second RAT is based on the modified mapping. In some examples, the mapping component 835 may add a fixed offset to the existing mapping between the scheduling delay of the second RAT and the scheduling delay command field in the DCI.

The adjustment factor component 840 may receive, from a network device, a power limit adjustment factor or a reduced power limit for the uplink communication associated with the first RAT. In some examples, the adjustment factor component 840 may receive, from a network device, a power limit adjustment factor or a reduced power limit for the total power limit. In some examples, the adjustment factor component 840 may receive, from a network device, a power limit adjustment factor or a reduced power limit for the uplink communication associated with the second RAT.

In some examples, the adjustment factor component 840 may receive, from a network device, a first power limit adjustment factor or a first reduced power limit for the uplink communication with the first group of cells associated with the first RAT and a second power limit adjustment factor or a second reduced power limit for the uplink communication with the second group of cells associated with the second RAT, where determining the first power limit is based on the first power limit adjustment factor or the second reduced power limit and determining the second power limit is based on the second power limit adjustment factor or the second reduced power limit. In some cases, a value of the power limit adjustment factor or the reduced power limit is less than or equal to one. In some cases, a combined value as a result of the first power limit adjustment factor or the first reduced power limit and the second power limit adjustment factor or the second reduced power limit is less than or equal to one.

The power sharing component 845 may perform power sharing for the uplink communication associated with the first RAT and the uplink communication associated with the second RAT based on determining that the combined transmit power exceeds or has a potential of exceeding the total power limit. In some examples, the power sharing component 845 may perform power sharing for the uplink communication associated with the first RAT and the uplink communication associated with the second RAT based on determining that the combined transmit power exceeds or has a potential of exceeding the adjusted total power limit.

Figure 9:
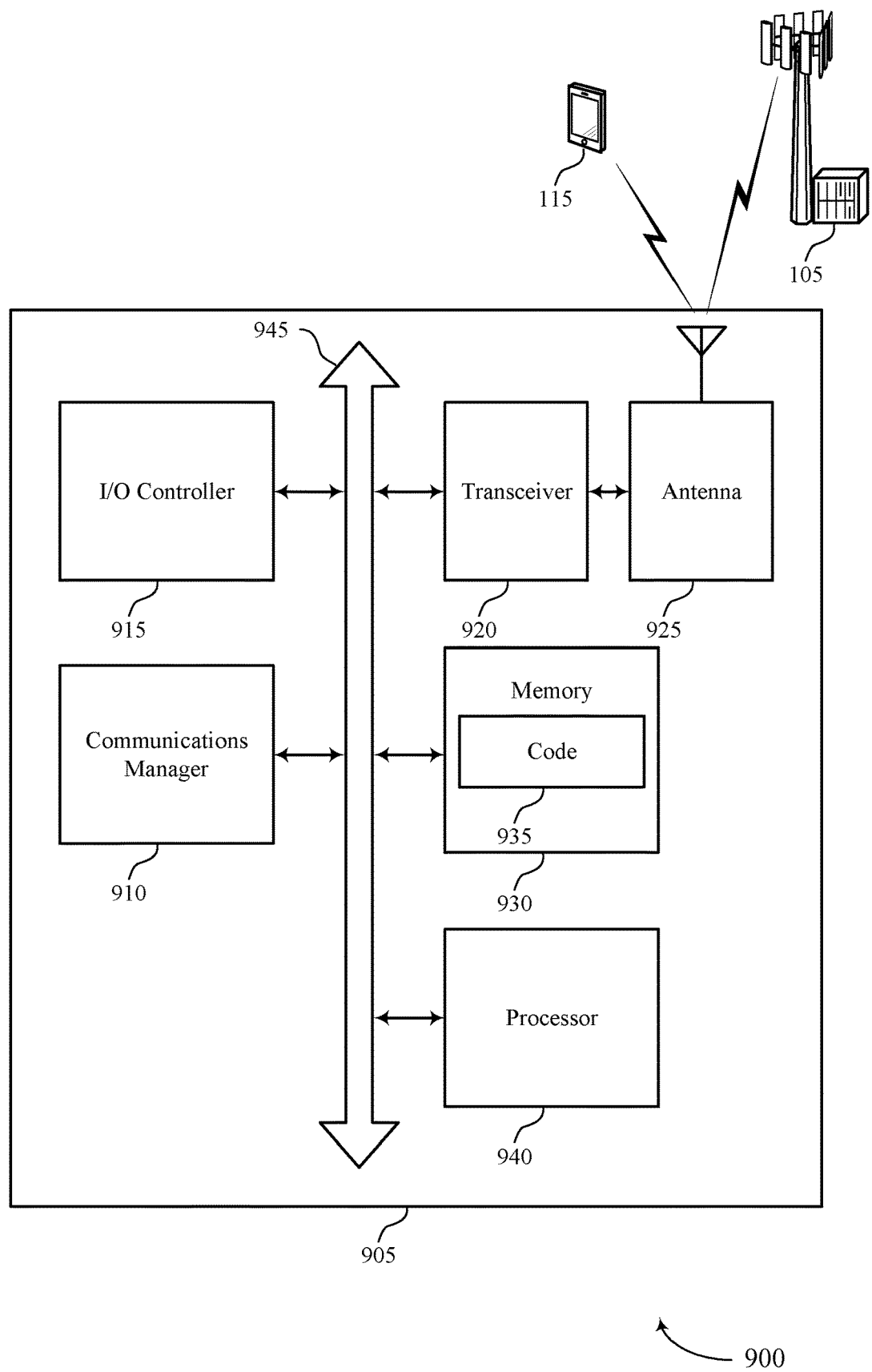
FIG. 9 shows a diagram of a system including a device that supports techniques for dual connectivity power control in accordance with aspects of the present disclosure.

FIG. 9 shows a diagram of a system 900 including a device 905 that supports techniques for dual connectivity power control in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a first set of grants for performing uplink transmissions between the UE and a first group of cells associated with a first RAT and a second set of grants for performing uplink communication between the UE and a second group of cells associated with a second RAT, the second RAT being an NR RAT, determine that a combined transmit power exceeds a total power limit or that there may be a potential of the combined power exceeding the total power limit, based on the first set of grants and the second set of grants, the combined transmit power including a first aggregated transmit power for an uplink channel using the first RAT and a second aggregated transmit power for an uplink channel using the second RAT, determine at least one of a first power limit for the first aggregated transmit power or a second power limit for the second aggregated transmit power, and perform the uplink communication with the first group of cells using the first RAT and the uplink communication with the second group of cells using the second RAT based on the first power limit, the second power limit, or both.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for dual connectivity power control).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
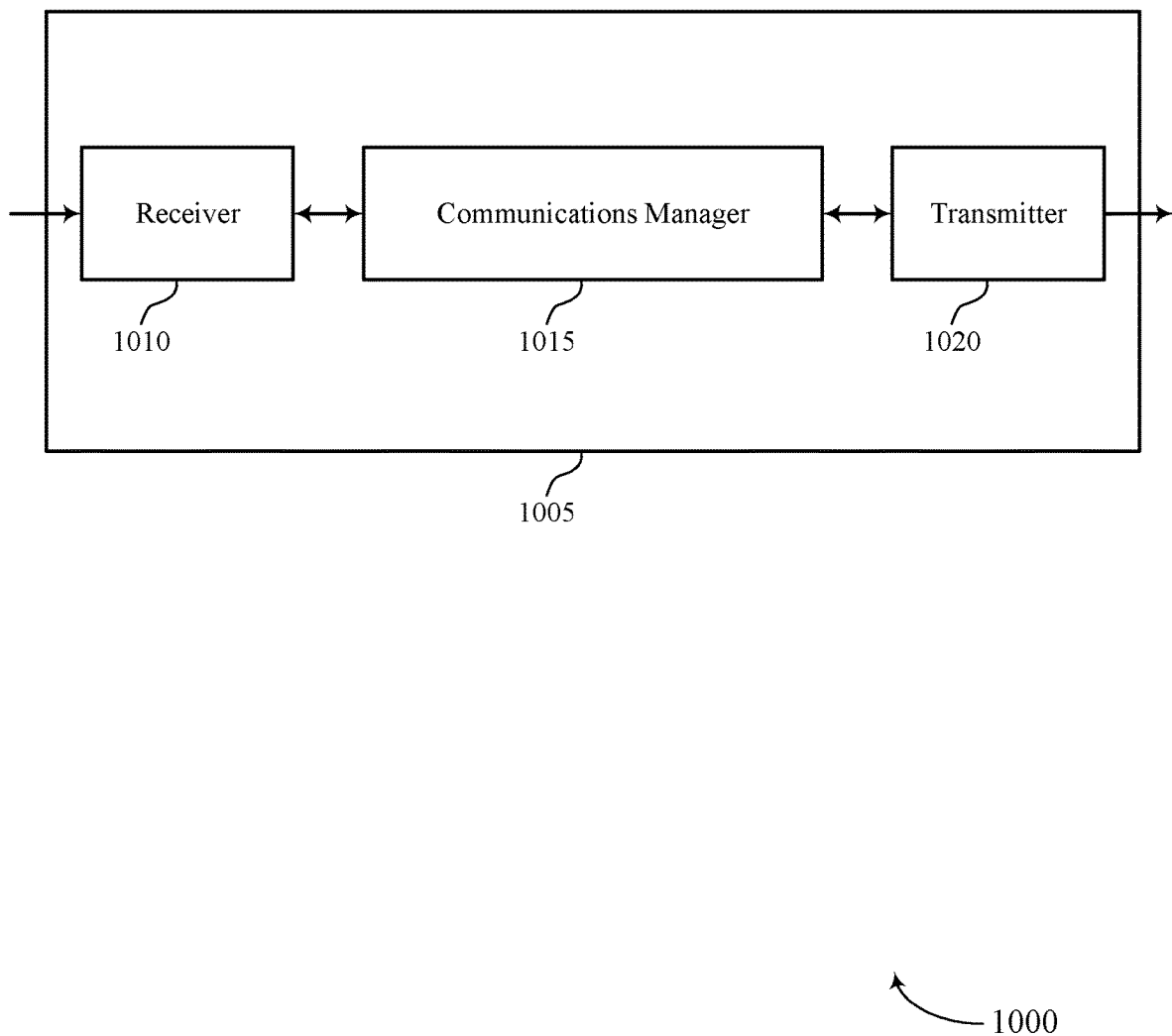
FIGS. 10 and 11 show block diagrams of devices that support techniques for dual connectivity power control in accordance with aspects of the present disclosure.

FIG. 10 shows a block diagram 1000 of a device 1005 that supports techniques for dual connectivity power control in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for dual connectivity power control, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify at least one of a scheduling delay, a power limit adjustment factor, or a reduced power limit for uplink communication associated with a RAT between a UE and the base station, where the scheduling delay is based on a UE capability and the RAT is an NR RAT, transmit a set of grants for performing uplink communication between the UE and the base station associated with the RAT based on the identifying, the set of grants including at least one of the determined scheduling delay, the determined power limit adjustment factor, or the reduced power limit and communicate with the UE using the RAT based on the set of grants. The communications manager 1015 may be an example of aspects of the communications manager 1410 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
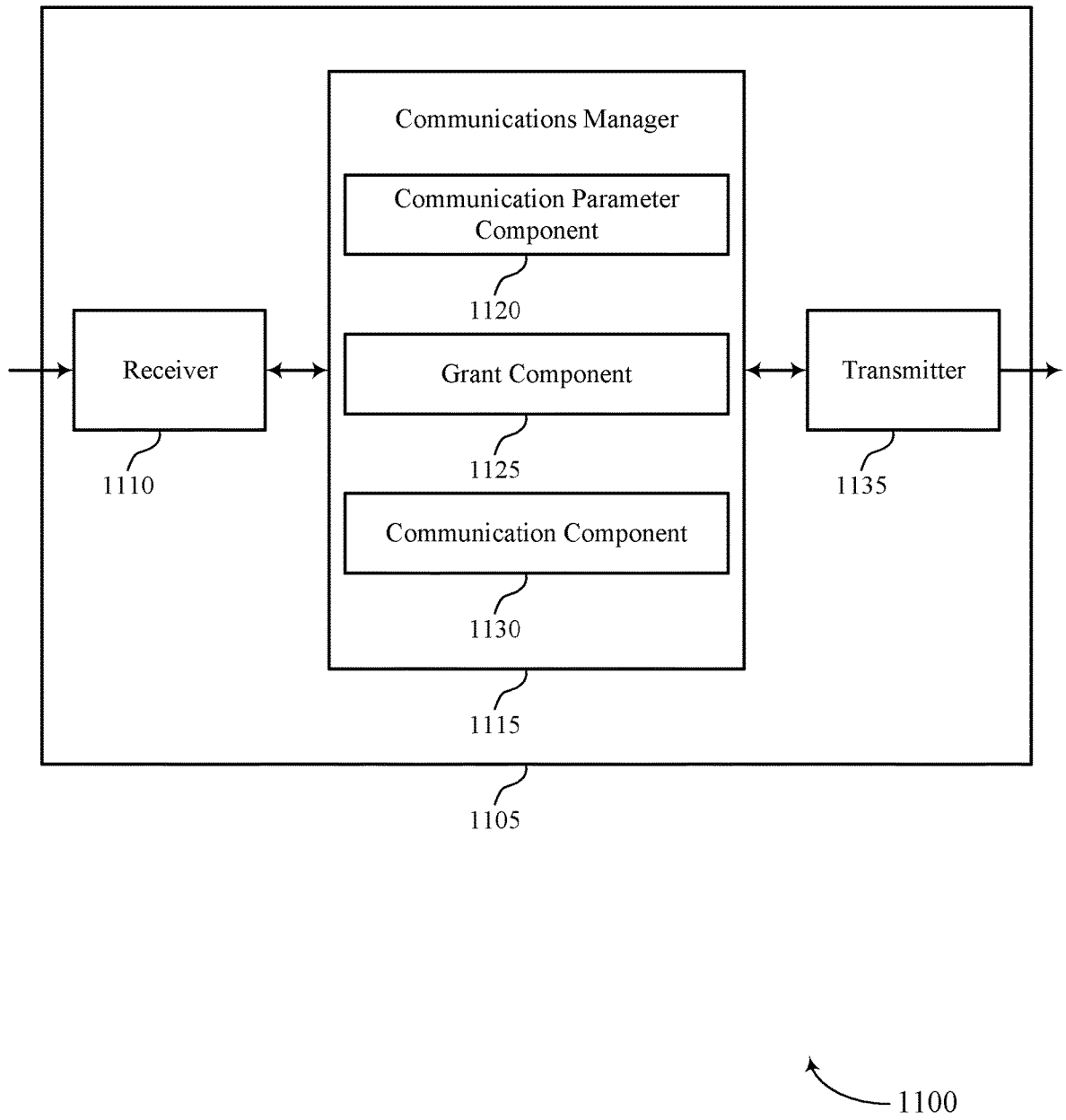

FIG. 11 shows a block diagram 1100 of a device 1105 that supports techniques for dual connectivity power control in accordance with aspects of the present disclosure. The device 1105 may be an example of aspects of a device 1005 or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for dual connectivity power control, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a communication parameter component 1120, a grant component 1125, and a communication component 1130. The communications manager 1115 may be an example of aspects of the communications manager 1410 described herein.

The communication parameter component 1120 may identify at least one of a scheduling delay, a power limit adjustment factor, or a reduced power limit for uplink communication associated with a RAT between a UE and the base station, where the scheduling delay is based on a UE capability and the RAT is a NR RAT. The grant component 1125 may transmit a set of grants for performing uplink communication between the UE and the base station associated with the RAT based on the identifying, the set of grants including at least one of the determined scheduling delay, the determined power limit adjustment factor, or the reduced power limit. The communication component 1130 may communicate with the UE using the RAT based on the set of grants.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
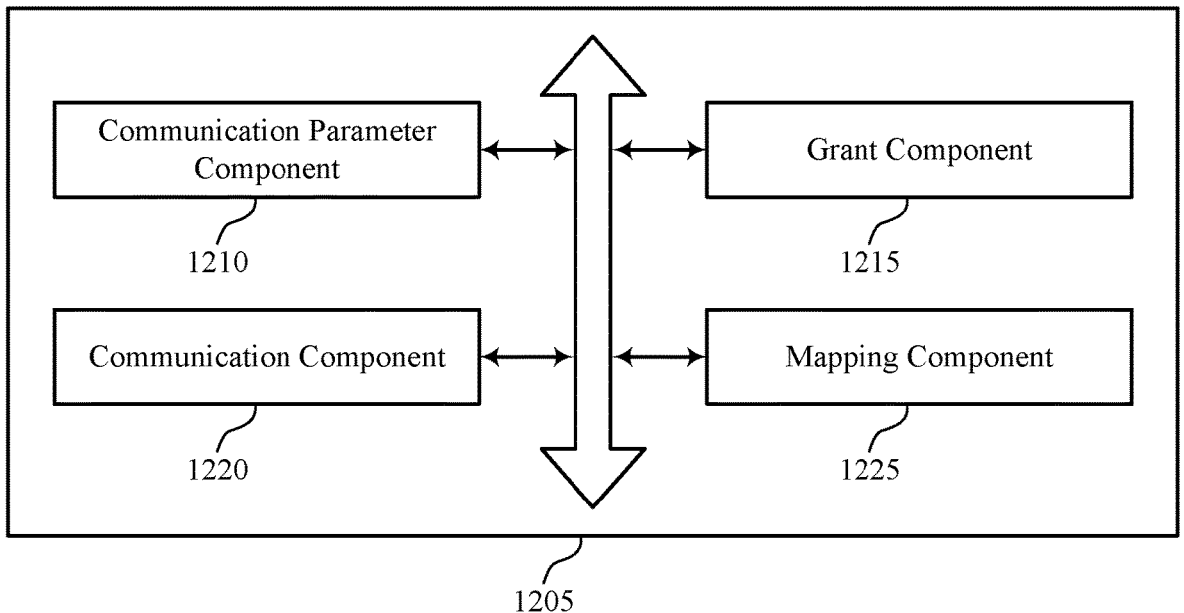
FIG. 12 shows a block diagram of a communications manager that supports techniques for dual connectivity power control in accordance with aspects of the present disclosure.

FIG. 12 shows a block diagram 1200 of a communications manager 1205 that supports techniques for dual connectivity power control in accordance with aspects of the present disclosure. The communications manager 1205 may be an example of aspects of a communications manager 1015, a communications manager 1115, or a communications manager 1310 described herein. The communications manager 1205 may include a communication parameter component 1210, a grant component 1215, a communication component 1220, and a mapping component 1225. Each of these modules may communicate, directly or indirectly, with one another (e.g., via one or more buses).

The communication parameter component 1210 may identify at least one of a scheduling delay, a power limit adjustment factor, or a reduced power limit for uplink communication associated with a RAT between a UE and the base station, where the scheduling delay is based on a UE capability and the RAT is an NR RAT.

In some examples, receiving an indication of the UE capability from the UE, where the indication of the UE capability includes a minimum scheduling delay for performing a power adjustment of a second RAT based on performing uplink communication with the base station using the RAT. In some examples, the communication parameter component 1210 may determine the scheduling delay based on the indication of the UE capability, where the scheduling delay satisfies a determined threshold. In some examples, the communication parameter component 1210 may communicate with the UE using the RAT based on a modified mapping that is based on the UE capability.

In some examples, the communication parameter component 1210 may receive the power limit adjustment factor or the reduced power limit, where communicating with the UE using the RAT is based on the power limit adjustment factor or the reduced power limit. In some cases, the scheduling delay is greater than or equal to a minimum scheduling delay for the uplink communication associated with a LTE RAT. In some cases, the scheduling delay is greater than or equal to four milliseconds or a predefined value. In some cases, a value of the power limit adjustment factor is less than or equal to one.

The grant component 1215 may transmit a set of grants for performing uplink communication between the UE and the base station associated with the RAT based on the identifying, the set of grants including at least one of the determined scheduling delay or the determined power limit adjustment factor or the determined reduced power limit. The communication component 1220 may communicate with the UE using the RAT based on the set of grants. The mapping component 1225 may transmit information identifying a mapping between the scheduling delay and a scheduling delay command field in a DCI for performing the uplink communication with the base station associated with the RAT.

Figure 13:
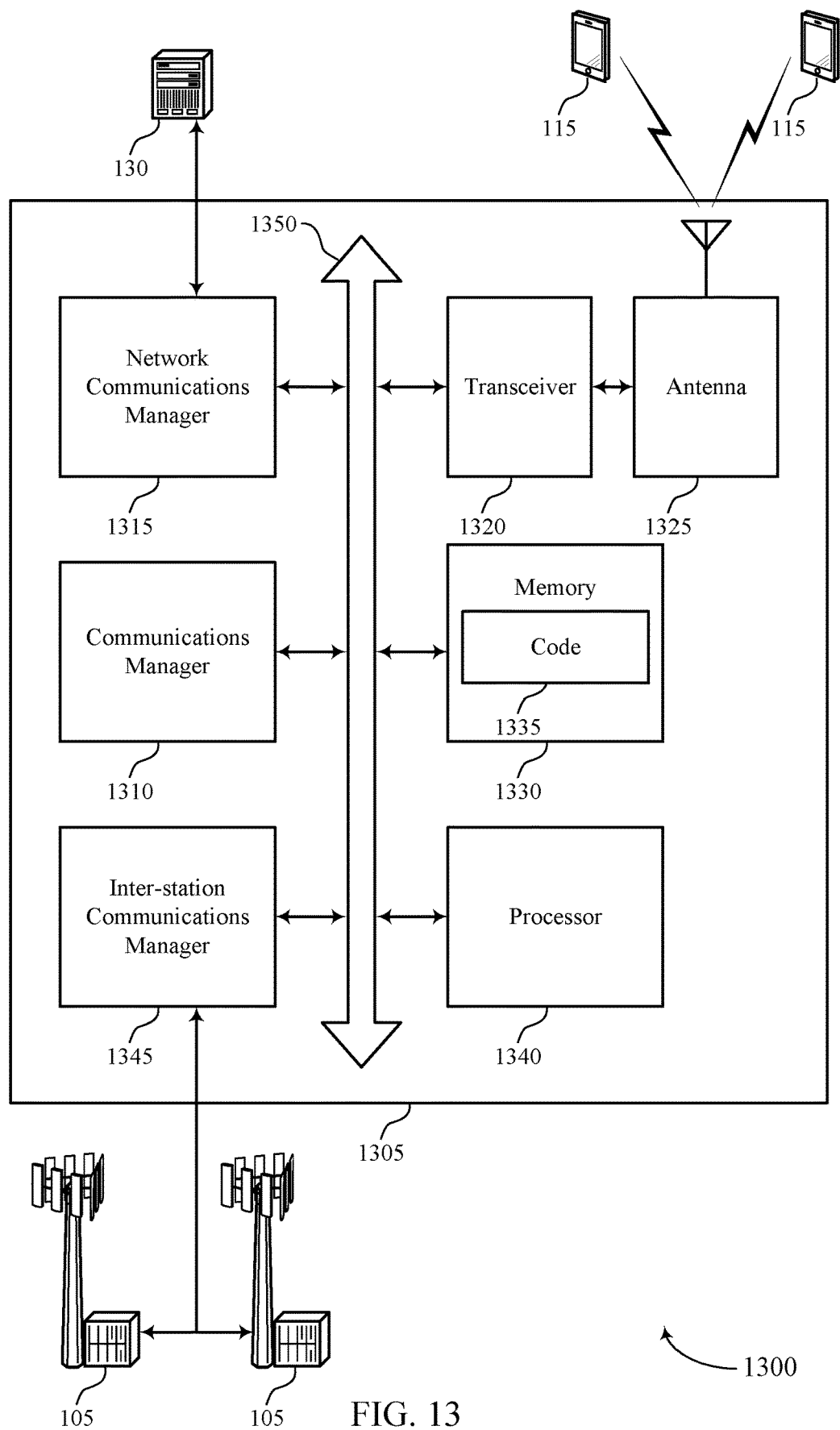
FIG. 13 shows a diagram of a system including a device that supports techniques for dual connectivity power control in accordance with aspects of the present disclosure.

FIG. 13 shows a diagram of a system 1300 including a device 1305 that supports techniques for dual connectivity power control in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify at least one of a scheduling delay, a power limit adjustment factor or, a reduced power limit for uplink communication associated with a RAT between a UE and the base station, where the scheduling delay is based on a UE capability and the RAT is an NR RAT, transmit a set of grants for performing uplink communication between the UE and the base station associated with the RAT based on the identifying, the set of grants including at least one of the determined scheduling delay, the determined power limit adjustment factor, or the reduced power limit, and communicate with the UE using the RAT based on the set of grants.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting techniques for dual connectivity power control).

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
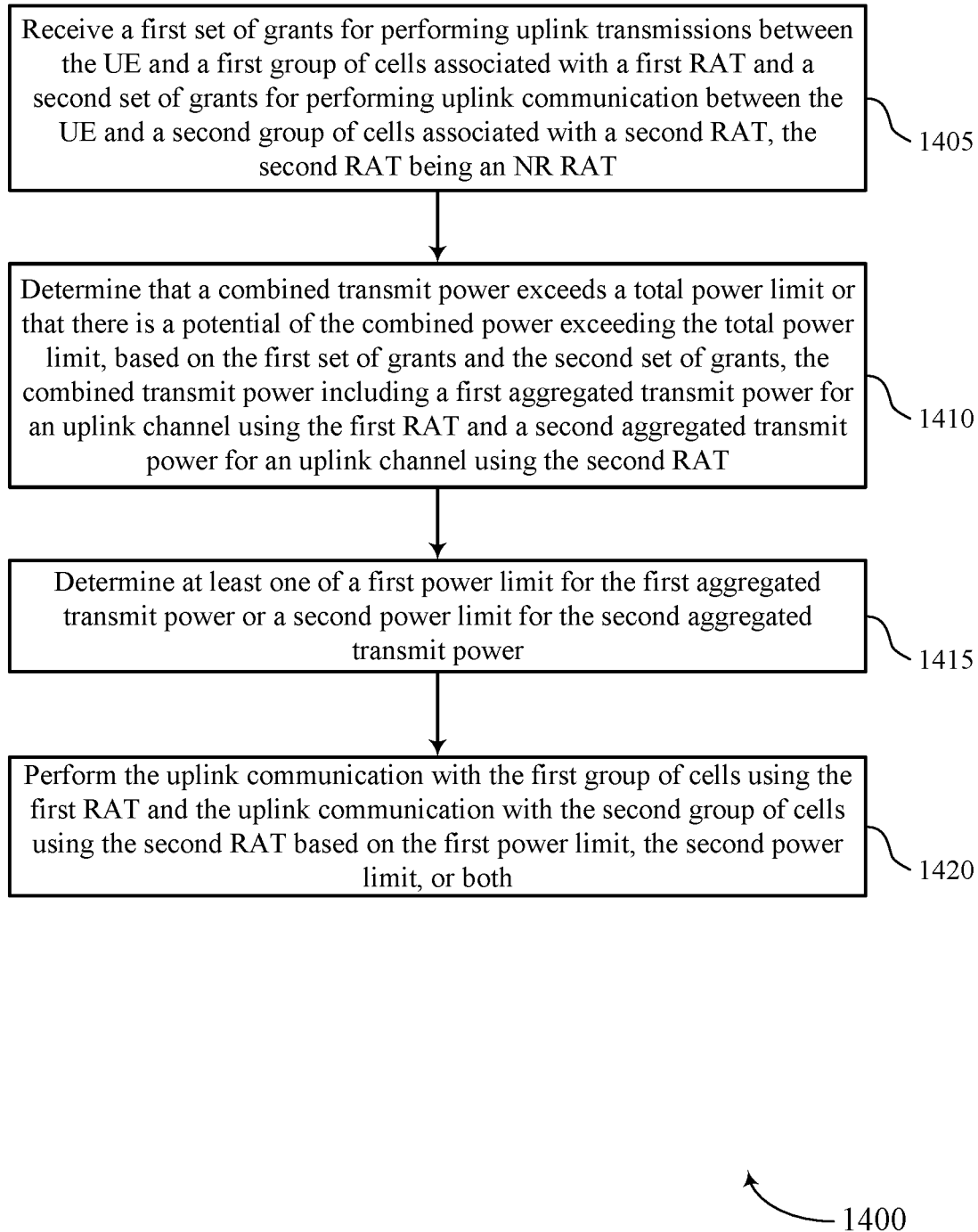
FIGS. 14 through 16 show flowcharts illustrating methods that support techniques for dual connectivity power control in accordance with aspects of the present disclosure.

FIG. 14 shows a flowchart illustrating a method 1400 that supports techniques for dual connectivity power control in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a first set of grants for performing uplink transmissions between the UE and a first group of cells associated with a first RAT and a second set of grants for performing uplink communication between the UE and a second group of cells associated with a second RAT, the second RAT being an NR RAT. The operations of 1405 may be performed according to the methods described herein. In some examples, aspects of the operations of 1405 may be performed by a grant component as described with reference to FIGS. 6 through 9.

At 1410, the UE may determine that a combined transmit power exceeds a total power limit or that there may be a potential of the combined power exceeding the total power limit, based on the first set of grants and the second set of grants, the combined transmit power including a first aggregated transmit power for an uplink channel using the first RAT and a second aggregated transmit power for an uplink channel using the second RAT. The operations of 1410 may be performed according to the methods described herein. In some examples, aspects of the operations of 1410 may be performed by a transmit power component as described with reference to FIGS. 6 through 9.

At 1415, the UE may determine at least one of a first power limit for the first aggregated transmit power or a second power limit for the second aggregated transmit power. The operations of 1415 may be performed according to the methods described herein. In some examples, aspects of the operations of 1415 may be performed by a power limit component as described with reference to FIGS. 6 through 9.

At 1420, the UE may perform the uplink communication with the first group of cells using the first RAT and the uplink communication with the second group of cells using the second RAT based on the first power limit, the second power limit, or both. The operations of 1420 may be performed according to the methods described herein. In some examples, aspects of the operations of 1420 may be performed by a communication component as described with reference to FIGS. 6 through 9.

Figure 15:
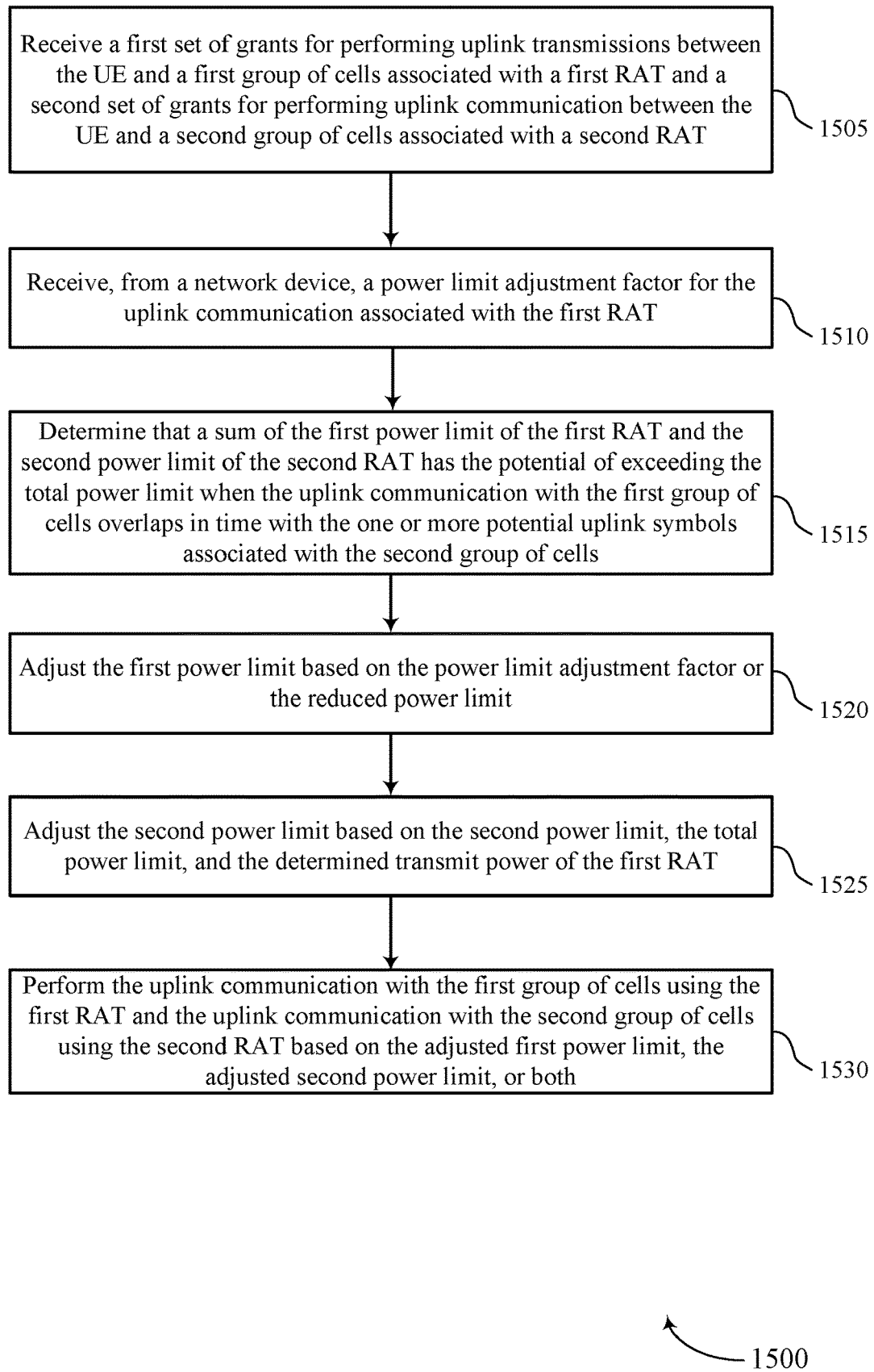

FIG. 15 shows a flowchart illustrating a method 1500 that supports techniques for dual connectivity power control in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a first set of grants for performing uplink transmissions between the UE and a first group of cells associated with a first RAT and a second set of grants for performing uplink communication between the UE and a second group of cells associated with a second RAT, the second RAT being an NR RAT. The operations of 1505 may be performed according to the methods described herein. In some examples, aspects of the operations of 1505 may be performed by a grant component as described with reference to FIGS. 6 through 9.

At 1510, the UE may receive, from a network device, a power limit adjustment factor or a reduced power limit for the uplink communication associated with the first RAT. The operations of 1510 may be performed according to the methods described herein. In some examples, aspects of the operations of 1510 may be performed by an adjustment factor component as described with reference to FIGS. 6 through 9.

At 1515, the UE may determine that a sum of the first power limit of the first RAT and the second power limit of the second RAT has the potential of exceeding the total power limit when the uplink communication with the first group of cells overlaps in time with one or more potential uplink symbols associated with the second group of cells. In some cases, the UE may determine that a sum of the first power limit of the first RAT and the second power limit of the second RAT exceeds the total power limit when the uplink communication with the first group of cells overlaps in time with one or more potential uplink symbols associated with the second group of cells. The operations of 1515 may be performed according to the methods described herein. In some examples, aspects of the operations of 1515 may be performed by a communication component as described with reference to FIGS. 6 through 9.

At 1520, the UE may adjust the first power limit based on the power limit adjustment factor or the reduced power limit. The operations of 1520 may be performed according to the methods described herein. In some examples, aspects of the operations of 1520 may be performed by a power limit component as described with reference to FIGS. 6 through 9.

At 1525, the UE may adjust the second power limit based on the second power limit, the total power limit, and the determined transmit power of the first RAT. The operations of 1525 may be performed according to the methods described herein. In some examples, aspects of the operations of 1525 may be performed by a power limit component as described with reference to FIGS. 6 through 9.

At 1530, the UE may perform the uplink communication with the first group of cells using the first RAT and the uplink communication with the second group of cells using the second RAT based on the adjusted first power limit, the adjusted second power limit, or both. The operations of 1530 may be performed according to the methods described herein. In some examples, aspects of the operations of 1530 may be performed by a communication component as described with reference to FIGS. 6 through 9.

Figure 16:
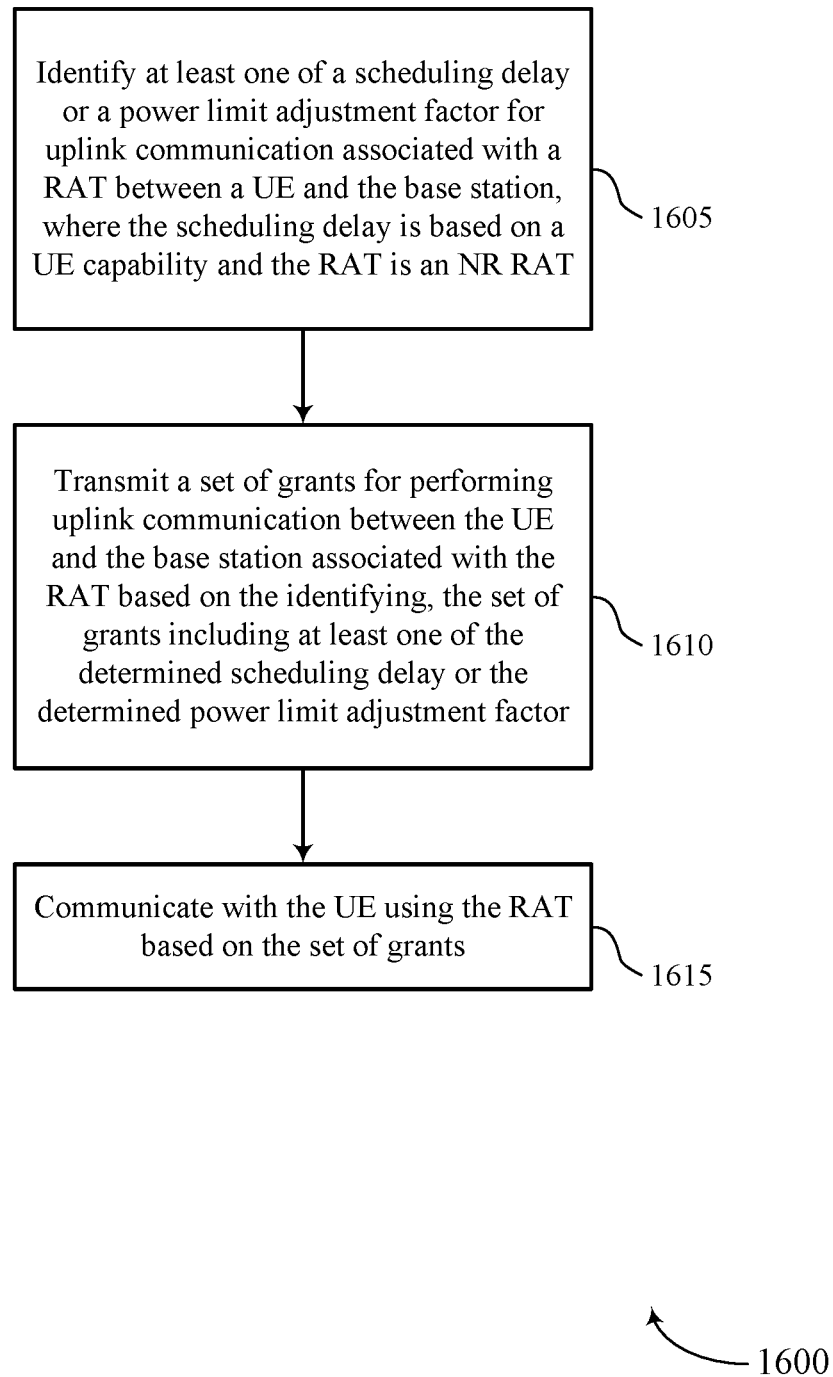

FIG. 16 shows a flowchart illustrating a method 1600 that supports techniques for dual connectivity power control in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may identify at least one of a scheduling delay, a power limit adjustment factor, or a reduced power limit for uplink communication associated with a RAT between a UE and the base station, where the scheduling delay is based on a UE capability and the RAT is an NR RAT. The operations of 1605 may be performed according to the methods described herein. In some examples, aspects of the operations of 1605 may be performed by a communication parameter component as described with reference to FIGS. 10 through 13.

At 1610, the base station may transmit a set of grants for performing uplink communication between the UE and the base station associated with the RAT based on the identifying, the set of grants including at least one of the determined scheduling delay, the determined power limit adjustment factor, or the reduced power limit. The operations of 1610 may be performed according to the methods described herein. In some examples, aspects of the operations of 1610 may be performed by a grant component as described with reference to FIGS. 10 through 13.

At 1615, the base station may communicate with the UE using the RAT based on the set of grants. The operations of 1615 may be performed according to the methods described herein. In some examples, aspects of the operations of 1615 may be performed by a communication component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such example).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a network device, comprising:
   identifying at least one of a scheduling delay or a power limit adjustment factor for uplink communication associated with a radio access technology (RAT) between a user equipment (UE) and the network device, wherein the scheduling delay is based at least in part on a UE capability, the power limit adjustment factor is for adjusting a transmit power at the UE such that a combined transmit power associated with the RAT and a second RAT is less than a total power limit, and the RAT is a New Radio (NR) RAT;
   transmitting a set of grants for performing uplink communication between the UE and the network device associated with the RAT based at least in part on the identifying, the set of grants comprising at least one of the identified scheduling delay or the identified power limit adjustment factor; and
   communicating with the UE using the RAT based at least in part on the set of grants.

2. The method of claim 1, further comprising:
   transmitting the power limit adjustment factor, wherein communicating with the UE using the RAT is based at least in part on the power limit adjustment factor.

3. The method of claim 1, wherein a value of the power limit adjustment factor is less than or equal to one.

4. The method of claim 1, further comprising:
   receiving an indication of the UE capability from the UE, wherein the indication of the UE capability comprises a minimum scheduling delay for performing a power adjustment of the second RAT based at least in part on performing uplink communication with the network device using the RAT; and
   determining the scheduling delay based at least in part on the indication of the UE capability, wherein the scheduling delay satisfies a determined threshold.

5. The method of claim 4, further comprising:
   transmitting information identifying a mapping between the scheduling delay and a scheduling delay command field in a downlink control indicator (DCI) for performing the uplink communication with the network device associated with the RAT; and
   communicating with the UE using the RAT based at least in part on a modified mapping that is based at least in part on the UE capability.

6. The method of claim 4, wherein the scheduling delay is greater than or equal to a minimum scheduling delay for the uplink communication associated with a Long Term Evolution (LTE) RAT.

7. The method of claim 4, wherein the scheduling delay is greater than or equal to four milliseconds or a predefined value.

8. An apparatus for wireless communication at a network device, comprising:
   a processor,
   memory in electronic communication with the processor; and
   instructions stored in the memory and executable by the processor to cause the apparatus to:
      identify at least one of a scheduling delay or a power limit adjustment factor for uplink communication associated with a radio access technology (RAT) between a user equipment (UE) and the network device, wherein the scheduling delay is based at least in part on a UE capability the power limit adjustment factor is for adjusting a transmit power at the UE such that a combined transmit power associated with the RAT and a second RAT is less than a total power limit, and the RAT is a New Radio (NR) RAT;
      transmit a set of grants for performing uplink communication between the UE and the network device associated with the RAT based at least in part on the identifying, the set of grants comprising at least one of the identified scheduling delay or the identified power limit adjustment factor; and
      communicate with the UE using the RAT based at least in part on the set of grants.

9. The apparatus of claim 8, wherein the instructions are further executable by the processor to cause the apparatus to:
   receive the power limit adjustment factor, wherein communicating with the UE using the RAT is based at least in part on the power limit adjustment factor.

10. The apparatus of claim 8, wherein a value of the power limit adjustment factor is less than or equal to one.

11. The apparatus of claim 8, wherein the instructions are further executable by the processor to cause the apparatus to:
  receive an indication of the UE capability from the UE, wherein the indication of the UE capability comprises a minimum scheduling delay for performing a power adjustment of the second RAT based at least in part on performing uplink communication with the network device using the RAT; and
  determine the scheduling delay based at least in part on the indication of the UE capability, wherein the scheduling delay satisfies a determined threshold.

12. The apparatus of claim 11, wherein the instructions are further executable by the processor to cause the apparatus to:
  transmit information identifying a mapping between the scheduling delay and a scheduling delay command field in a downlink control indicator (DCI) for performing the uplink communication with the network device associated with the RAT; and
  communicate with the UE using the RAT based at least in part on a modified mapping that is based at least in part on the UE capability.

13. The apparatus of claim 11, wherein the scheduling delay is greater than or equal to a minimum scheduling delay for the uplink communication associated with a Long Term Evolution (LTE) RAT.

14. The apparatus of claim 11, wherein the scheduling delay is greater than or equal to four milliseconds or a predefined value.

15. An apparatus for wireless communication at a network device, comprising:
  means for identifying at least one of a scheduling delay or a power limit adjustment factor for uplink communication associated with a radio access technology (RAT) between a user equipment (UE) and the network device, wherein the scheduling delay is based at least in part on a UE capability the power limit adjustment factor is for adjusting a transmit power at the UE such that a combined transmit power associated with the RAT and a second RAT is less than a total power limit, and the RAT is a New Radio (NR) RAT;
  means for transmitting a set of grants for performing uplink communication between the UE and the network device associated with the RAT based at least in part on the identifying, the set of grants comprising at least one of the identified scheduling delay or the identified power limit adjustment factor; and
  means for communicating with the UE using the RAT based at least in part on the set of grants.

16. The apparatus of claim 15, further comprising:
  means for receiving the power limit adjustment factor, wherein communicating with the UE using the RAT is based at least in part on the power limit adjustment factor.

17. The apparatus of claim 15, wherein a value of the power limit adjustment factor is less than or equal to one.

18. The apparatus of claim 15, further comprising:
  means for receiving an indication of the UE capability from the UE, wherein the indication of the UE capability comprises a minimum scheduling delay for performing a power adjustment of the second RAT based at least in part on performing uplink communication with the network device using the RAT; and
  means for determining the scheduling delay based at least in part on the indication of the UE capability, wherein the scheduling delay satisfies a determined threshold.

19. The apparatus of claim 18, further comprising:
  means for transmitting information identifying a mapping between the scheduling delay and a scheduling delay command field in a downlink control indicator (DCI) for performing the uplink communication with the network device associated with the RAT; and
  means for communicating with the UE using the RAT based at least in part on a modified mapping that is based at least in part on the UE capability.

20. The apparatus of claim 18, wherein the scheduling delay is greater than or equal to a minimum scheduling delay for the uplink communication associated with a Long Term Evolution (LTE) RAT.

21. The apparatus of claim 18, wherein the scheduling delay is greater than or equal to four milliseconds or a predefined value.

22. A non-transitory computer-readable medium storing code for wireless communication at a network device, the code comprising instructions executable by a processor to:
  identify at least one of a scheduling delay or a power limit adjustment factor for uplink communication associated with a radio access technology (RAT) between a user equipment (UE) and the network device, wherein the scheduling delay is based at least in part on a UE capability the power limit adjustment factor is for adjusting a transmit power at the UE such that a combined transmit power associated with the RAT and a second RAT is less than a total power limit, and the RAT is a New Radio (NR) RAT;
  transmit a set of grants for performing uplink communication between the UE and the network device associated with the RAT based at least in part on the identifying, the set of grants comprising at least one of the identified scheduling delay or the identified power limit adjustment factor; and
  communicate with the UE using the RAT based at least in part on the set of grants.

23. The non-transitory computer-readable medium of claim 22, wherein the instructions are further executable by the processor to:
  receive the power limit adjustment factor, wherein communicating with the UE using the RAT is based at least in part on the power limit adjustment factor.

24. The non-transitory computer-readable medium of claim 22, wherein a value of the power limit adjustment factor is less than or equal to one.

25. The non-transitory computer-readable medium of claim 22, wherein the instructions are further executable by the processor to:
  receive an indication of the UE capability from the UE, wherein the indication of the UE capability comprises a minimum scheduling delay for performing a power adjustment of the second RAT based at least in part on performing uplink communication with the network device using the RAT; and
  determine the scheduling delay based at least in part on the indication of the UE capability, wherein the scheduling delay satisfies a determined threshold.

26. The non-transitory computer-readable medium of claim 25, wherein the instructions are further executable by the processor to:
  transmit information identifying a mapping between the scheduling delay and a scheduling delay command field in a downlink control indicator (DCI) for performing the uplink communication with the network device associated with the RAT; and communicate with the UE using the RAT based at least in part on a modified mapping that is based at least in part on the UE capability.

27. The non-transitory computer-readable medium of claim 25, wherein the scheduling delay is greater than or equal to a minimum scheduling delay for the uplink communication associated with a Long Term Evolution (LTE) RAT.

28. The non-transitory computer-readable medium of claim 25, wherein the scheduling delay is greater than or equal to four milliseconds or a predefined value.

* * * * *